US 7,657,842 B2

(12) United States Patent
Matthews et al.

(10) Patent No.: US 7,657,842 B2
(45) Date of Patent: Feb. 2, 2010

(54) SIDEBAR TILE FREE-ARRANGEMENT

(75) Inventors: David A Matthews, Seattle, WA (US); Mark R Ligameri, Snohomish, WA (US); Charles Cummins, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 646 days.

(21) Appl. No.: 10/985,919

(22) Filed: Nov. 12, 2004

(65) Prior Publication Data

US 2006/0107231 A1    May 18, 2006

(51) Int. Cl.
    *G06F 3/048* (2006.01)
(52) U.S. Cl. .................. 715/788; 715/764; 715/779
(58) Field of Classification Search .................. 715/788, 715/764, 779
    See application file for complete search history.

(56) References Cited

U.S. PATENT DOCUMENTS

| 5,129,052 | A |   | 7/1992  | Barker et al. |          |
|-----------|---|---|---------|---------------|----------|
| 5,140,677 | A | * | 8/1992  | Fleming et al.| 715/835  |
| 5,179,655 | A | * | 1/1993  | Noguchi et al.| 715/797  |
| 5,301,348 | A | * | 4/1994  | Jaaskelainen  | 714/46   |
| 5,422,993 | A | * | 6/1995  | Fleming       | 715/835  |
| 5,479,602 | A | * | 12/1995 | Baecker et al.| 715/838  |
| 5,546,521 | A | * | 8/1996  | Martinez      | 715/711  |
| 5,754,174 | A | * | 5/1998  | Carpenter et al. | 715/810 |
| 5,767,850 | A | * | 6/1998  | Ramanathan et al. | 715/797 |
| 5,784,067 | A | * | 7/1998  | Ryll et al.   | 345/440  |
| 5,796,398 | A | * | 8/1998  | Zimmer        | 715/835  |
| 5,819,055 | A |   | 10/1998 | MacLean et al.|          |
| 5,831,617 | A | * | 11/1998 | Bhukhanwala   | 715/839  |
| 5,859,639 | A | * | 1/1999  | Ebrahim       | 715/788  |
| 5,937,417 | A |   | 8/1999  | Nielsen       |          |
| 6,029,175 | A |   | 2/2000  | Chow et al.   |          |
| 6,031,530 | A |   | 2/2000  | Trueblood     |          |
| 6,043,817 | A | * | 3/2000  | Bolnick et al.| 715/788  |
| 6,243,724 | B1| * | 6/2001  | Mander et al. | 715/526  |
| 6,259,461 | B1|   | 7/2001  | Brown         |          |
| 6,311,221 | B1|   | 10/2001 | Raz et al.    |          |
| 6,539,392 | B1| * | 3/2003  | Rebane        | 707/101  |
| 6,693,652 | B1|   | 2/2004  | Barrus et al. |          |

(Continued)

FOREIGN PATENT DOCUMENTS

EP      514307 A2  *  11/1992

OTHER PUBLICATIONS

"Microsoft Windows XP in 10 Steps or Less", by Bill Hatfield, published by Wiley Publishing Inc. in 2004, pp. i, ii, 112.*

(Continued)

*Primary Examiner*—William L Bashore
*Assistant Examiner*—Gregory A DiStefano
(74) *Attorney, Agent, or Firm*—Shook, Hardy & Bacon LLP

(57) ABSTRACT

The present invention relates to a system and method for displaying information on a display such that access to applications or dynamic information through independent user interfaces may be attained in a designated area on a display and may be easily and conveniently moved from the designated area on the display to any other location in the display. Further, the applications or independent user interfaces may be arranged automatically such that the independent user interfaces may be substantially evenly spaced.

35 Claims, 27 Drawing Sheets

U.S. PATENT DOCUMENTS

| | | | |
|---|---|---|---|
| 6,724,403 B1* | 4/2004 | Santoro et al. | 715/765 |
| 7,188,169 B2* | 3/2007 | Buus et al. | 709/224 |
| 2001/0030667 A1* | 10/2001 | Kelts | 345/854 |
| 2002/0080170 A1 | 6/2002 | Goldberg et al. | |
| 2002/0135621 A1 | 9/2002 | Angiulo et al. | |
| 2002/0161837 A1 | 10/2002 | Sasaki et al. | |
| 2005/0044058 A1* | 2/2005 | Matthews et al. | 707/1 |
| 2006/0005207 A1* | 1/2006 | Louch et al. | 719/328 |
| 2006/0013462 A1* | 1/2006 | Sadikali | 382/132 |
| 2007/0101297 A1* | 5/2007 | Forstall et al. | 715/841 |

OTHER PUBLICATIONS

"Move applications on taskbar", Reasearch Disclosure No. 465218, by IBM Corporation, published by Kenneth Mason Publications Ltd in Jan. 2003, pp. i, 1, 2.*

-"Desktop Sidebar", published at http://www.desktopsidebar.com on Oct. 9, 2004, pp. i, ii, iii, 1-6.*

"Application document icon", published in Apr. 1993 by Kenneth Mason Publications Ltd, Research Disclosure No. 348071, 2 pages.*

Snippets Product Overview. Downloaded from www.snippets.com Jun. 11, 2001.

Printout of representative pages from www.snippets.com website: Jun. 11, 2001.

Printout of representative pages from www.infogate.com website: Jun. 11, 2001.

The Octopus Platform. Downloaded from www.octopus.com Jun. 11, 2001.

Multiplying enterprise Application ROI, An Octopus Whitepaper. Apr. 2001, Downloaded from www.octopus.com Jun. 11, 2001.

Printout of representative pages from www.dodots.com website: Jun. 11, 2001.

Printout of representative pages from www.enfish.com website: Jun. 11, 2001.

S. Parsowith, et al. "Tickertape: Notification and Communication in a Single Line". Publication date unknown.

N. Marmasse. "Commotion: a context-aware communication system". In Proceedings of CHI, 1999.

S. Greenberg and M. Rounding, "The Notification Collage: Posting Information to Public and Personal displays", Yellow Series Report 2000-667-19, Department of Computer Science, University of Calgary, Alberta, Canada. Publication date unknown.

BotKnowledge, "InfoGate Review", 2000. "www.botknowledge.com/infogatereview.html", 1 page.

Konfabulator, Version 2.1.1., Aug. 3, 2005 at www.konfabulator.com, downloaded Nov. 15, 2005.

Corporate Portals Letter, vol. 1, No. 10, Oct. 2000, 3 pages.

* cited by examiner

SIDEBAR TILE FREE-ARRANGEMENT

FIELD OF THE INVENTION

The present invention relates to displaying an organization of user interfaces on a display in a computer system and, in particular, displaying and organizing user interfaces in relation to other displayed elements.

BACKGROUND OF THE INVENTION

Computer users have struggled with the need for easy access to information in an easy and convenient manner. Typically, computer users do not have complete control over where access to desired information is located on a display. For example, if a user desires information related to latest news events, sports scores, stock information, or the like, the user might have to access the information at a designated location on the display. If that location were not readily available, for example, the user would not be able to access the information without performing various time-consuming actions to gain access to the information. Such actions might include closing or minimizing windows, some of which may be windows that the user is currently using. As a result, the user would have to interrupt his/her regular computer activities to obtain the desired information. Thus, the user would experience great frustration at having little to no control over how the desired information is displayed resulting in interruption of work.

Also, if user interfaces are moved on a display, an unpleasant uneven distribution of the user interfaces on the display would result. If a user moved a user interface in a group of user interfaces, an unsightly gap would exist in the previous location. This problem is compounded when multiple user interfaces are relocated over time. Also, user interfaces might appear excessively crowded in the location to which the interface was moved. A user would have to spend large amounts of time and effort to rearrange the interfaces manually which would still not accurately space the elements since such manual rearrangement would only result in approximate spacings perceptible to the human eye and dependent on the user's eye-hand coordination or the user would have to take extra time-consuming steps to instruct the computer to realign the interfaces. However, these actions interrupt the user's regular work. If the user does not interrupt his activities and spend time to attend to this matter, an unsightly appearance of unaligned and seemingly haphazard placement of display elements results.

Thus, there exists a need in the art for a system and method for providing access to information in an adjustable way in which the information is both easily and conveniently accessible to the user and conveniently arranged in an orderly fashion on the display according to the user's preferences.

SUMMARY OF THE INVENTION

The system and method enables the user to efficiently perform desired computer tasks while also achieving access to desired information without the inconvenience and frustration of a loss of access to displayed information or loss of workspace.

In one aspect of the present invention, a method and system is provided for displaying at least one independent user interface on a display in a designated area on the display. The at least one independent user interface may be moved from the designated area to another location on the display either outside or inside of the designated area such that independent user interfaces in the designated area are automatically rearranged resulting in the independent user interfaces remaining in the designated area being substantially evenly spaced.

In another aspect of the present invention, the designated area may be located on an edge of the display.

In another aspect of the present invention, the independent user interface is moved to a location outside of the designated area and may be moved back to a location within the designated area such that the independent user interfaces in the designated area are automatically rearranged such that the independent user interfaces in the designated area are substantially evenly spaced.

In another aspect of the present invention, an independent user interface may be moved from a location within a designated area on a display to a location outside of the designated area that is occupied by another display element. The display element may be a window, for example. The independent user interface may be set to be displayed in back of other display elements (e.g., "always-on-bottom") or on top of other display elements (e.g., "always-on-top").

In another aspect of the present invention, other display elements may be minimized while the independent user interface is being moved from one location on the display to another location on the display. The minimized display elements may be restored after the independent user interface is positioned on the display.

In another aspect of the present invention, the independent user interfaces or the designated area may be displayed when a cursor hovers over a predetermined location on the display. In one example, the predetermined location may be in the designated area on the display.

In another aspect of the present invention, the independent user interface may be associated with a taskbar button and is displayed on top of other display elements when the taskbar button is selected.

DETAILED DESCRIPTION

Figure 1:
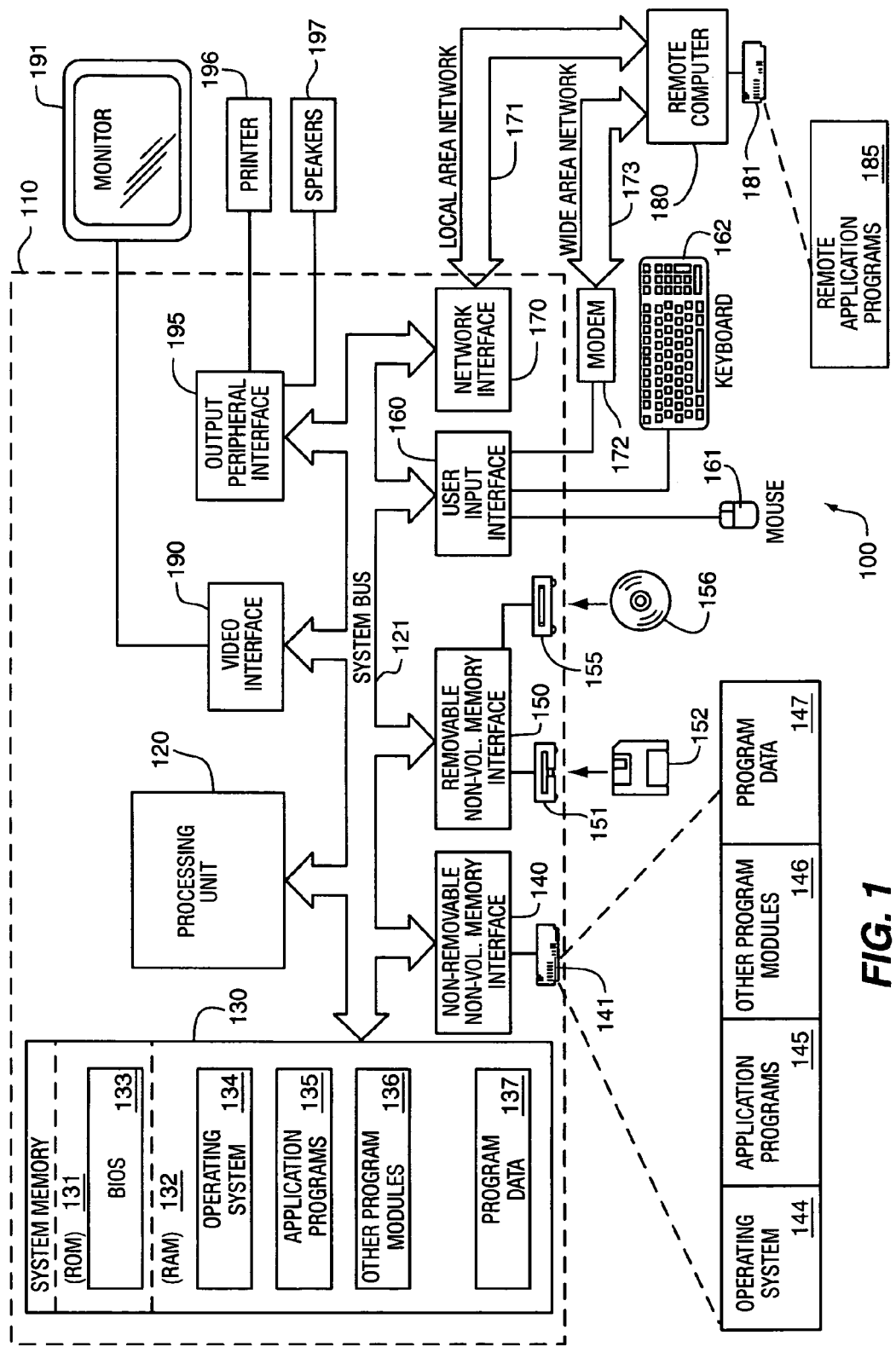
FIG. 1 illustrates an example of a system for implementing the invention which includes a general purpose computing device in the form of a computer.

Aspects of the present invention provide a system and method of efficiently displaying information on a display device including providing a designated area on a display device containing a plurality of independent user interfaces. The independent user interfaces include but are not limited to tiles, applications, real-time information, or controls. Typically, the user interfaces are in a small form-factor and may provide dynamic information to the user. In one embodiment, the independent user interfaces are arranged in a single column, however, the independent user interfaces may be arranged in any order or style.

The information provided by the independent user interfaces include dynamic information which might be frequently updated. Such information may be of special interest to a user to stay abreast of the latest developments. For example, the independent user interfaces may provide stock quote information, weather information, sports results or other sports-related information, news information, auction information or buddy lists. However, the present invention is not limited to these forms of information as any information, data or control that may be displayed to a user may be applied to the present invention.

In one aspect of the present invention, the independent user interfaces may be provided on a display device in a designated area of the display. The designated area may be at any location on the display. In one embodiment, the designated area is on a side edge of the display. In another embodiment, the designated area is on a top or bottom edge of the display. However, the designated area is not limited to an edge of the display as the designated area may be located anywhere on the display as desired by the user.

In another aspect of the present invention, an independent user interface is moved from the designated area to another location within the designated area. When the independent user interface is moved from its location in the designated area, the location typically contains an empty space which can be unsightly for computer users. Likewise, after the independent user interface is repositioned in the designated area at the other location, the other location would display crowding of independent user interfaces. Overcrowding of independent user interfaces in one area of the designated area with empty gaps in space in other areas of the designated area is unsightly and results in discomfort and uneasiness in the user. In the present invention, the plurality of independent user interfaces, including the independent user interface that was moved, automatically rearrange after positioning of the independent user interface being moved such that the plurality of independent user interfaces are substantially evenly spaced.

In another aspect of the present invention, an independent user interface is moved from the designated area to a location outside of the designated area. In this example, the location in the designated area where the independent user interface was located is an empty space after the independent user interface is moved to the other location. After positioning of the independent user interface at the location outside of the designated area, the plurality of independent user interfaces remaining in the designated area automatically rearrange so that they are substantially evenly spaced. In this way, symmetry is preserved. The independent user interface that is moved out of the designated area may be freely rearranged into any position on the display.

In another aspect of the present invention, an independent user interface is moved from the designated area to a location outside of the designated area where the location may contain another display element. Such a display element may include, for example, a window. In one example, the independent user interface may be set to "always-on-top" in which the display element (e.g., the window) sits in back of the independent user interface after the independent user interface is positioned on the display. In this example, the independent user interface is not covered by other regular display elements, such as regular windows. In another example, the independent user interface may be set to "always-on-bottom" in which the independent user interface sits in back of the display element (e.g., the window) after the independent user interface is positioned on the display. In this alternate example, the independent user interface is covered by other regular display elements, such as regular windows.

If two or more windows or independent user interfaces are placed at the same location and each has the same priority setting in terms of being on the bottom or top (i.e., all elements are set to "always-on-bottom" or "always-on-top"), then a set of rules may be invoked to determine which element is displayed on top. In one example, the most recently used element is displayed on top.

Also, if an independent user interface is set to "always-on-bottom" and is obscured by an overlying display element such as a regular window, the independent user interface that is obscured by the overlying display element may be displayed by minimizing the display element while the independent user interface is being rearranged. In this example, the user is not impeded by overlying display elements while attempting to relocate an independent user interface. In another example, once the independent user interface is repositioned, the other display elements, such as the regular windows previously displayed may be restored. Alternatively, a delay may occur after positioning of the independent user interface such that the regular windows previously displayed are restored only after a predetermined period of time elapses. In this example, accidental restoration of the display elements prior to successful and final placement of the independent user interface is prevented.

In another aspect of the present invention, independent user interfaces moved from the designated area to a location on the display outside of the designated area may be set to "always-on-bottom". In this example, the independent user interfaces may not be visible if there are overlying display elements on top of the independent user interfaces. Visual access to the independent user interface may be obtained temporarily such that a user may gain information contained in the independent user interfaces. Such visual access may be gained by a variety of methods. In one example, a cursor may hover over a predetermined area in the designated area to cause the temporary display of the independent user interfaces. In another example, a user may click a button or select from menu to cause the temporary display of the independent user interfaces. Likewise, the designated area itself may be set to "always-on-top" or "always-on-bottom". If the designated area itself is set to "always-on-bottom" and other display elements are obscuring the designated area, the designated area may also be temporarily displayed in a similar fashion.

When an independent user interface is moved from a location in the designated area to a location outside of the designated area, the independent user interface may be positioned at a location occupied by a desktop icon. In this example, the independent user interface may interact with the desktop icon in a number of ways. For example, the independent user interface may position itself on the side of the desktop icon. Alternatively, the desktop icons may reposition themselves such that the desktop icons reflow around the independent user interface. In this example, the independent user interface does not obscure the desktop icons. In addition, the desktop icons may automatically rearrange to maintain an ordered appearance.

Likewise, if an independent user interface is moved onto another independent user interface, either the pre-existing independent user interface or the independent user interface may be rearranged such that the independent user interfaces do not overlap one another and an ordered appearance is maintained.

In another aspect of the present invention, the independent user interfaces may be freely rearranged on the display but the independent user interfaces may be associated with a taskbar button. If the independent user interface is in back of another display element, such as a regular window, then clicking the taskbar button associated with the independent user interface brings the independent user interface to the front such that the independent user interface is visible on top of the other display element. In one example, the independent user interface is set to "always-on-bottom" and is displayed on top of an overlying window when the taskbar button associated with the independent user interface is clicked. In this example, the independent user interface may return to the bottom of the display when focus is returned to a window on the display. In another example, the independent user interface is set to "always-on-top" and gains focus when the taskbar button associated with the independent user interface is clicked. In another example, the independent user interface toggles between "always-on-bottom" and "always-on-top" when the independent user interface has focus and the taskbar button associated with the independent user interface is clicked. Alternatively, clicking the taskbar button may minimize the independent user interface. Also, clicking the taskbar button may have no effect at all.

An independent user interface as described may contain an optional flyout which shows more information associated with the independent user interface. The flyout is an optional piece of user interface that provides a superset of the contents of the body of the independent user interface. When the independent user interface is positioned at a location outside of the designated area, the flyout may still be available to the user. Typically, when an independent user interface is located in the designated area, the flyout may be a clickable region along the edge of the screen. However, when the independent user interface is repositioned outside of the designated area, the flyout clickable region may extend around any aspect of the independent user interface. In one example, the flyout clickable region extends around four sides of the independent user interface. In another example, the flyout clickable region appears along the top aspect of the independent user interface resembling a titlebar on a window. The invention is not limited to any particular configuration of flyout clickable regions as any configuration may be applicable in the present invention.

In another aspect of the present invention, independent user interfaces that have been moved from the designated area to a location outside of the designated area are returned to the designated area while maintaining the spacing of the independent user interfaces in the designated area. In this example, when an independent user interface is moved from a location outside of the designated area back into the designated area, the independent user interfaces already in the designated area shift location to accommodate the independent user interface being moved. Independent user interfaces that do not fit in the designated area may be optionally placed in an overflow area.

The present invention may be implemented in an operating environment. FIG. 1 illustrates an example of a suitable operating environment 100 in which aspects of the present invention may be implemented. The operating environment 100 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

With reference to FIG. 1, an illustrative system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media includes both volatile and nonvolatile media, removable and non-removable media. By way of example, and not limitation, computer readable media may comprise computer storage media and communication media and includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
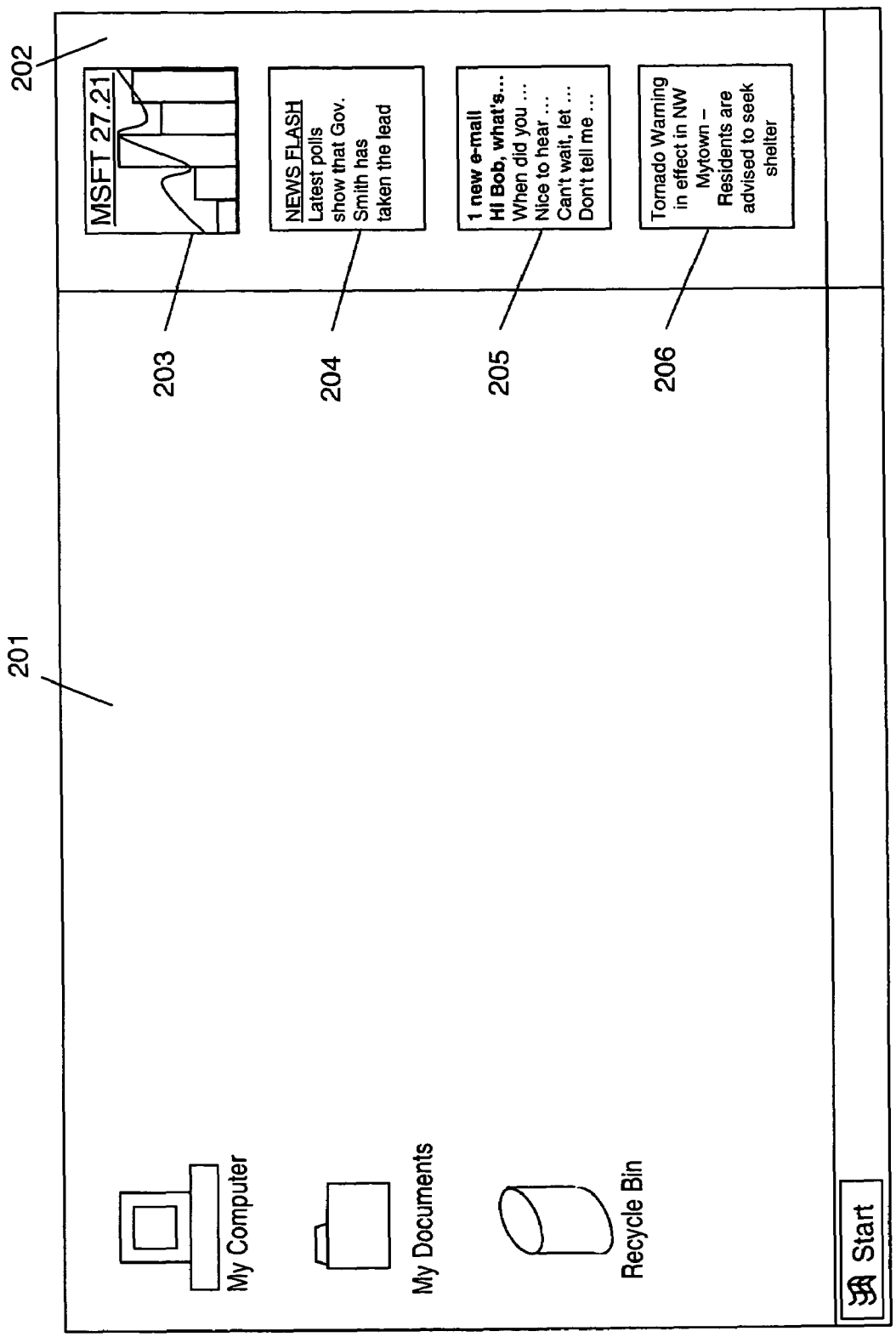
FIG. 2 illustrates an example of independent user interfaces provided in a designated area of a display.

FIG. 2 illustrates an example of independent user interfaces provided in a designated area of a display. The independent user interface may provide dynamic information to a user. FIG. 2 illustrates non-limiting examples of such dynamic information. For example, independent user interface 203 provides stock quote information, trends and graphs, independent user interface 204 provides news information, independent user interface 205 provides instant messenger and mailbox information, and independent user interface 206 provides weather information (including emergency alerts). The independent user interfaces (203-206) illustrated in the example, provide dynamic information that may be updated periodically. In many cases, the information is updated frequently such that the user may stay informed about the latest events.

A display 201 contains a designated area 202. Although the designated area 202 in this example contains four independent user interfaces (203, 204, 205, and 206), any number or arrangement of user interfaces may be used. Also, FIG. 2 illustrates the designated area 202 as on a side of the display 201, e.g., the right side of the display 201. However, the present invention is not so limited as the designated area 202 may be located at any location on the display 201.

Figure 3A:
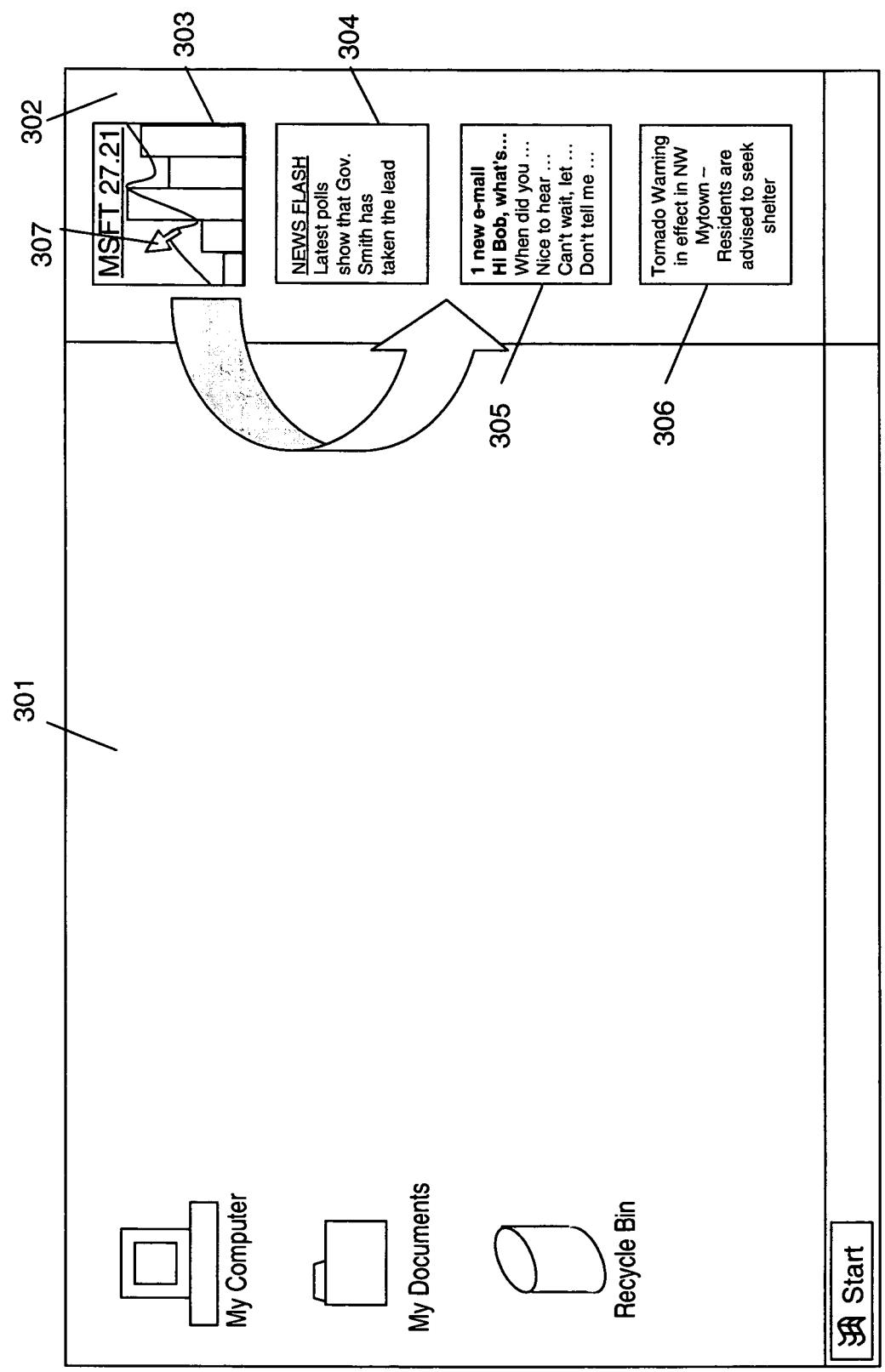
FIGS. 3A-3C illustrate another example of an aspect of the present invention in which an independent user interface is moved within the designated area.
Figure 3B:
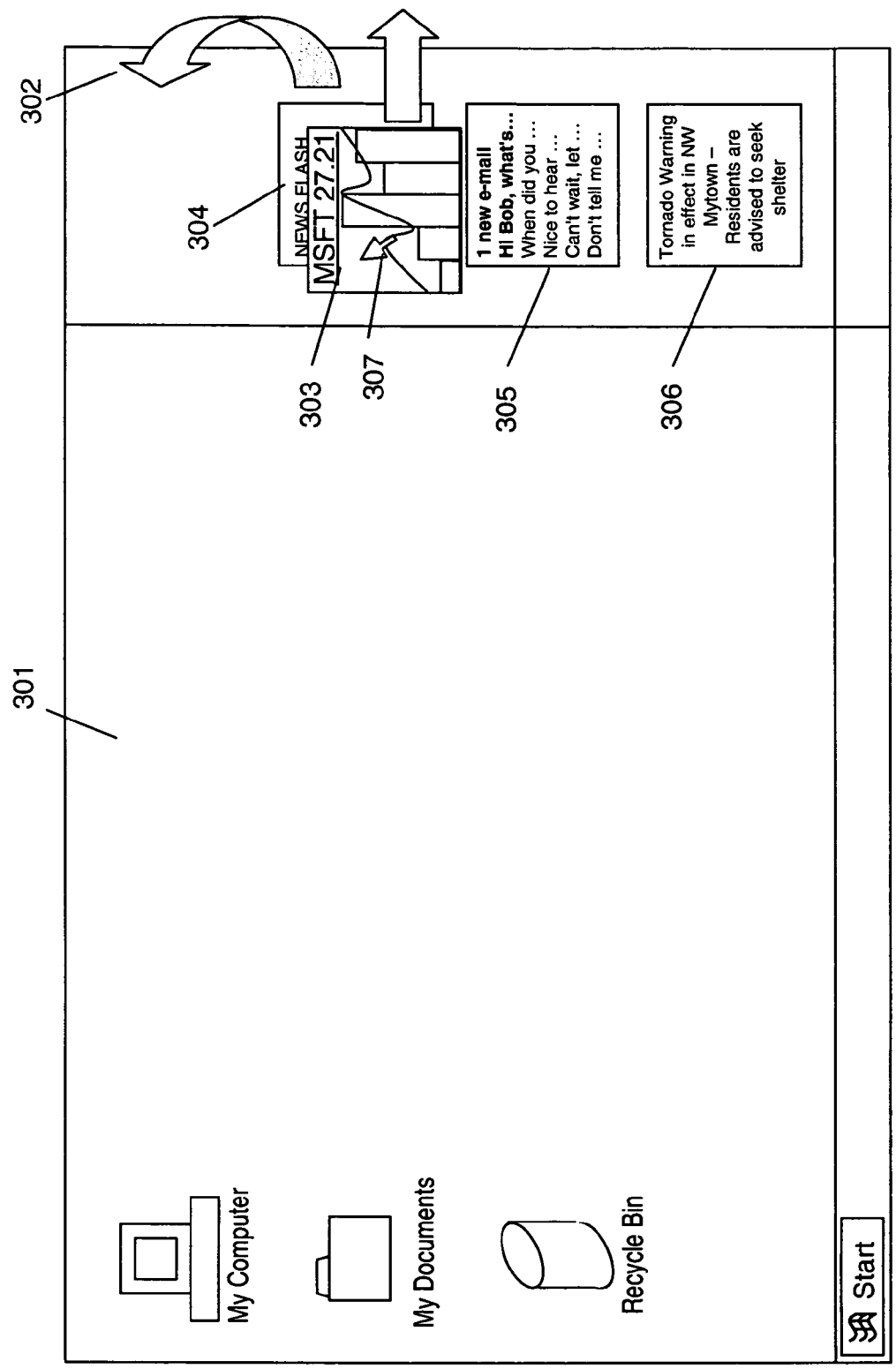
Figure 3C:
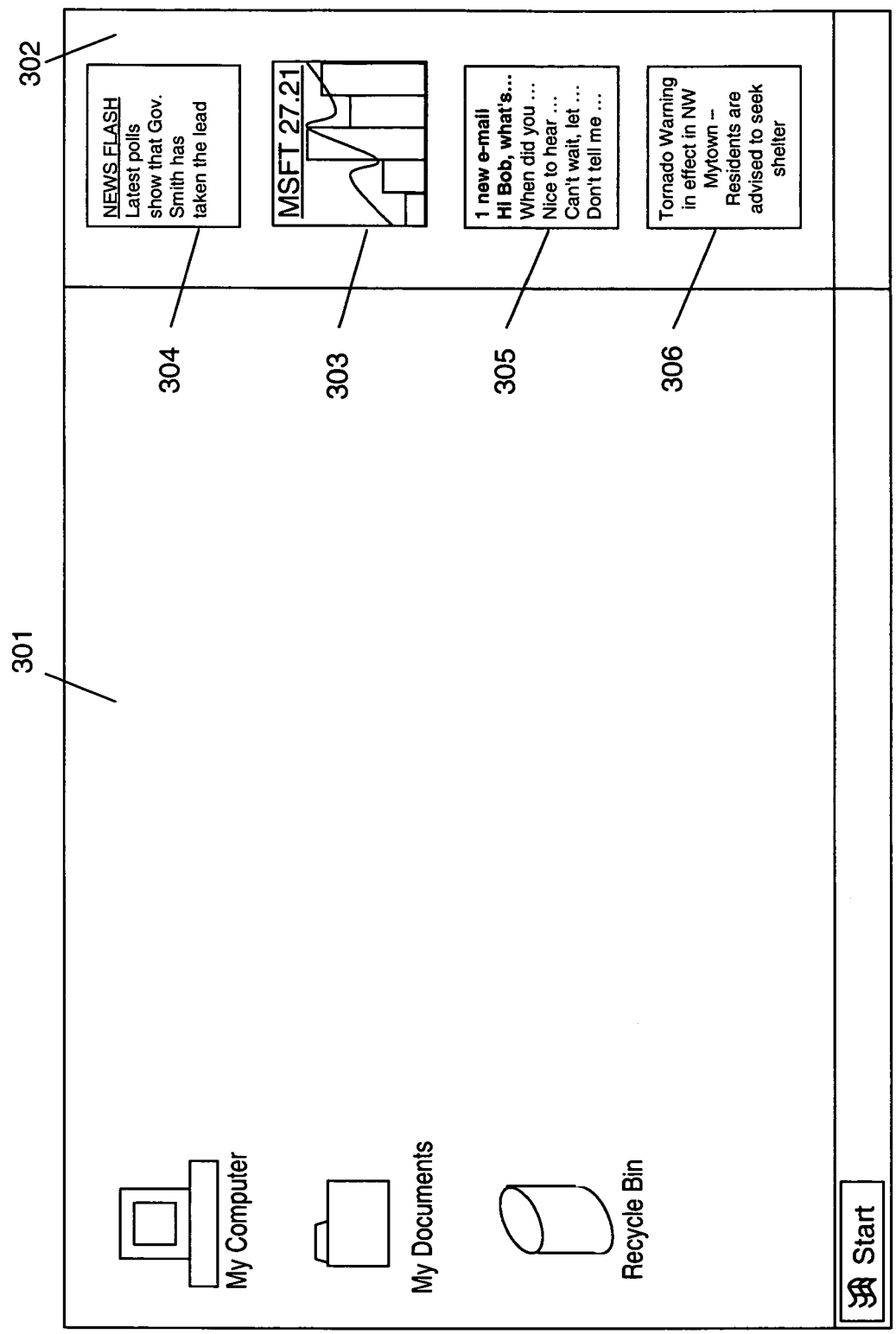

FIGS. 3A-3C illustrate another example of an aspect of the present invention in which an independent user interface is moved within the designated area. FIG. 3A illustrates a display 301 containing a designated area 302 with four independent user interfaces (303, 304, 305, and 306). The independent user interfaces provide dynamic information that may be updated as needed. As such, the latest information may be provided to the user via the independent user interfaces including but not limited to stock and securities information, weather information, new and/or sports information, auction information, instant messenger information, etc. In this example, one independent user interface 303 (providing the latest, updated information on the stock price of MSFT and graphs of trends) is moved from a first location to a second location within the designated area 302 as indicated by the arrow. In this example, a cursor 307 is used to drag the first independent user interface 303 to a second location within the designated area 302. FIG. 3B illustrates the first independent user interface 303 being moved to a location between a second independent user interface 304 and a third independent user interface 305. Prior to placement of the first independent user interface 303 at the new location within the designated area 302, an empty space is present at the location from which the first independent user interface 303 was moved from. FIG. 3C illustrates the display 301 after positioning of the first independent user interface 303. The first independent user interface 303 is placed at the new location within the designated area 302 and the other independent user interfaces (304, 305, and 306) may be moved to accommodate the new position of the first independent user interface 303 while continuing to provide updated, dynamic information. In this case, news, mail/instant messaging and weather information. In this example, the second independent user interface 304 (that provides dynamic information on breaking news) moves to the location which was occupied by the first independent user interface 303 prior to moving the first independent user interface 303. Thus, the four independent user interfaces (303, 304, 305, and 306) are automatically rearranged in the designated area 302 on the display 301 based on the available space within designated area 302 and the number and size of the independent user interfaces (303-306).

Figure 4A:
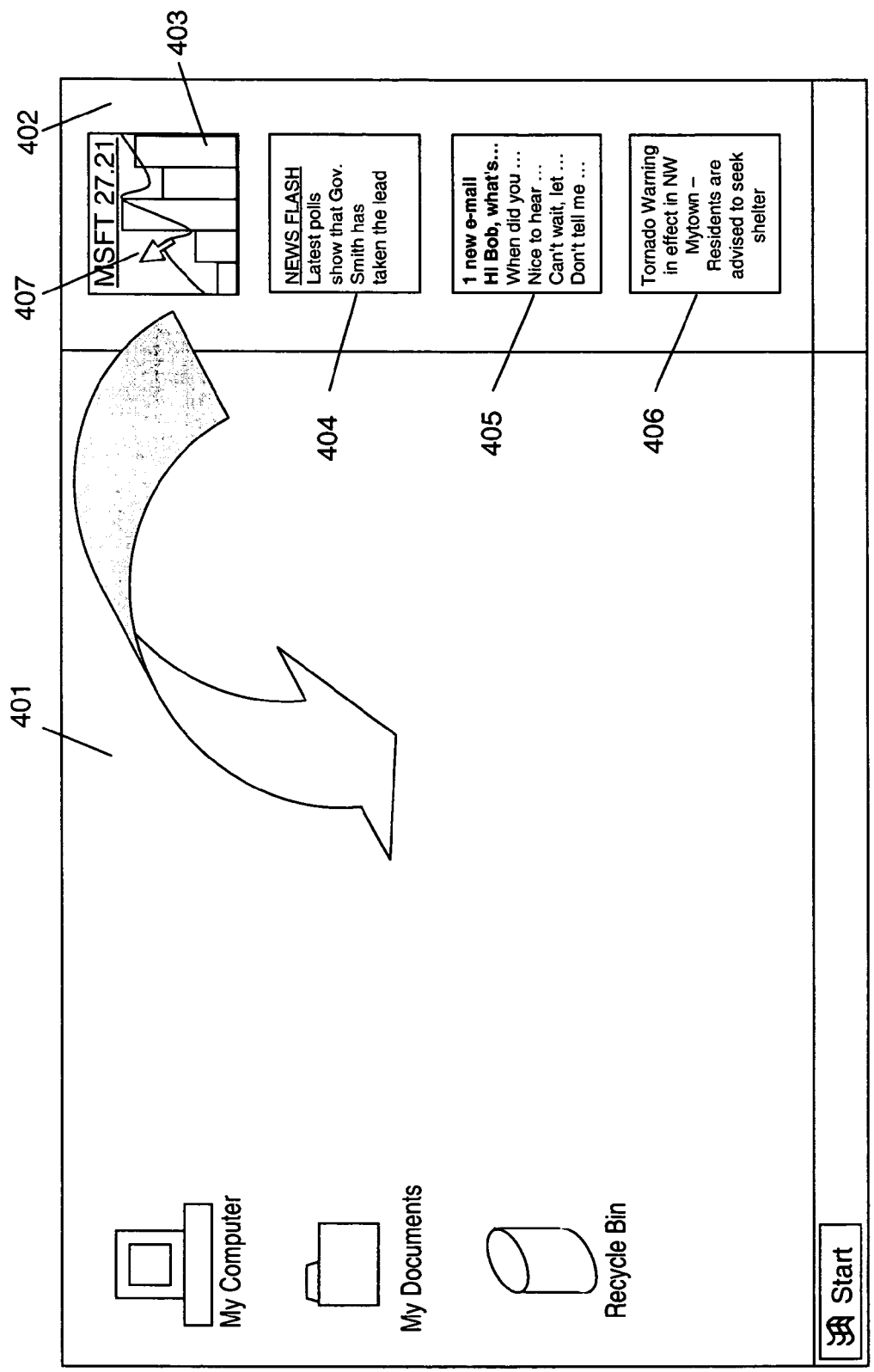
FIGS. 4A-4C illustrate another example of an aspect of the present invention in which an independent user interface from a designated area on a display is moved outside of the designated area.
Figure 4B:
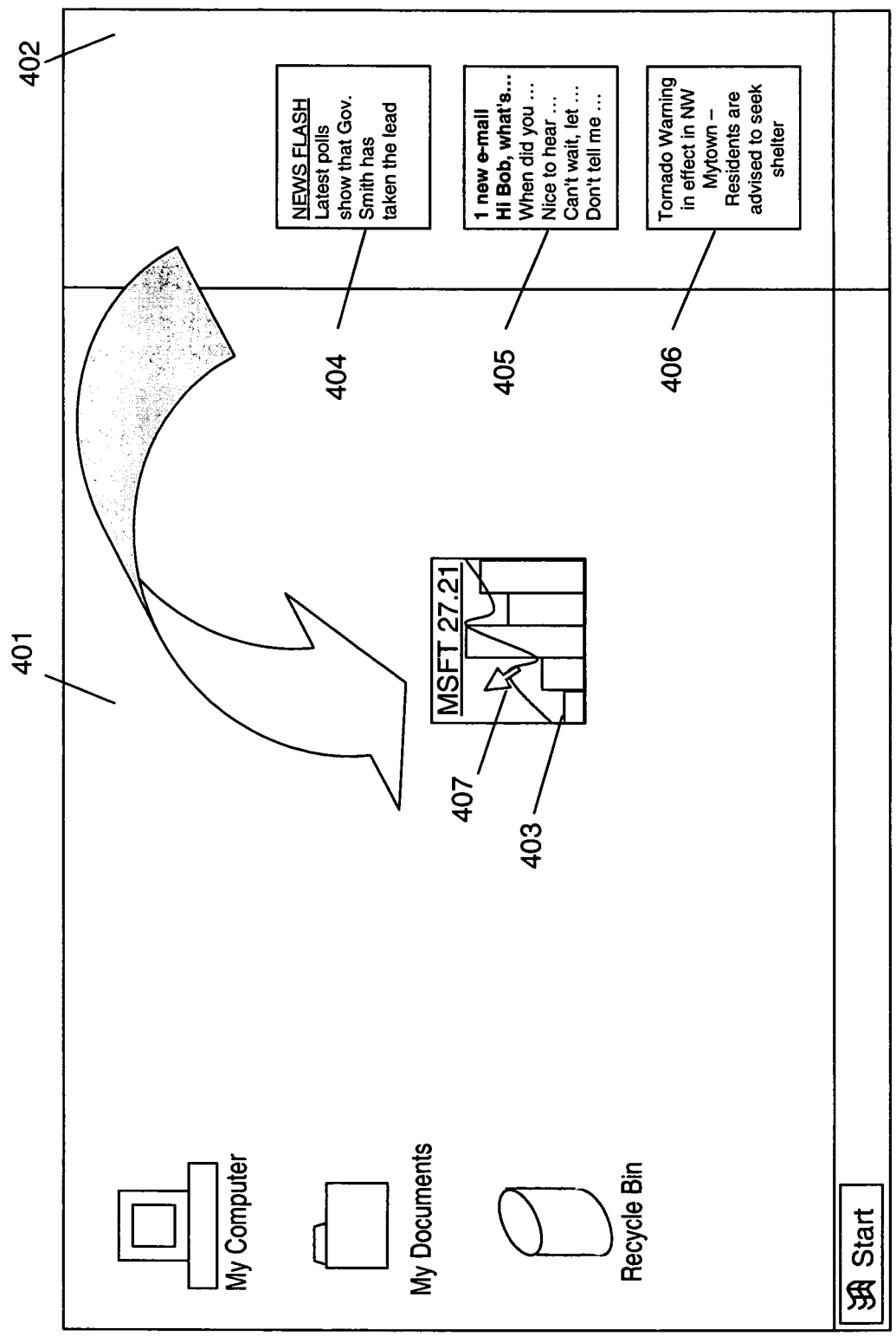
Figure 4C:
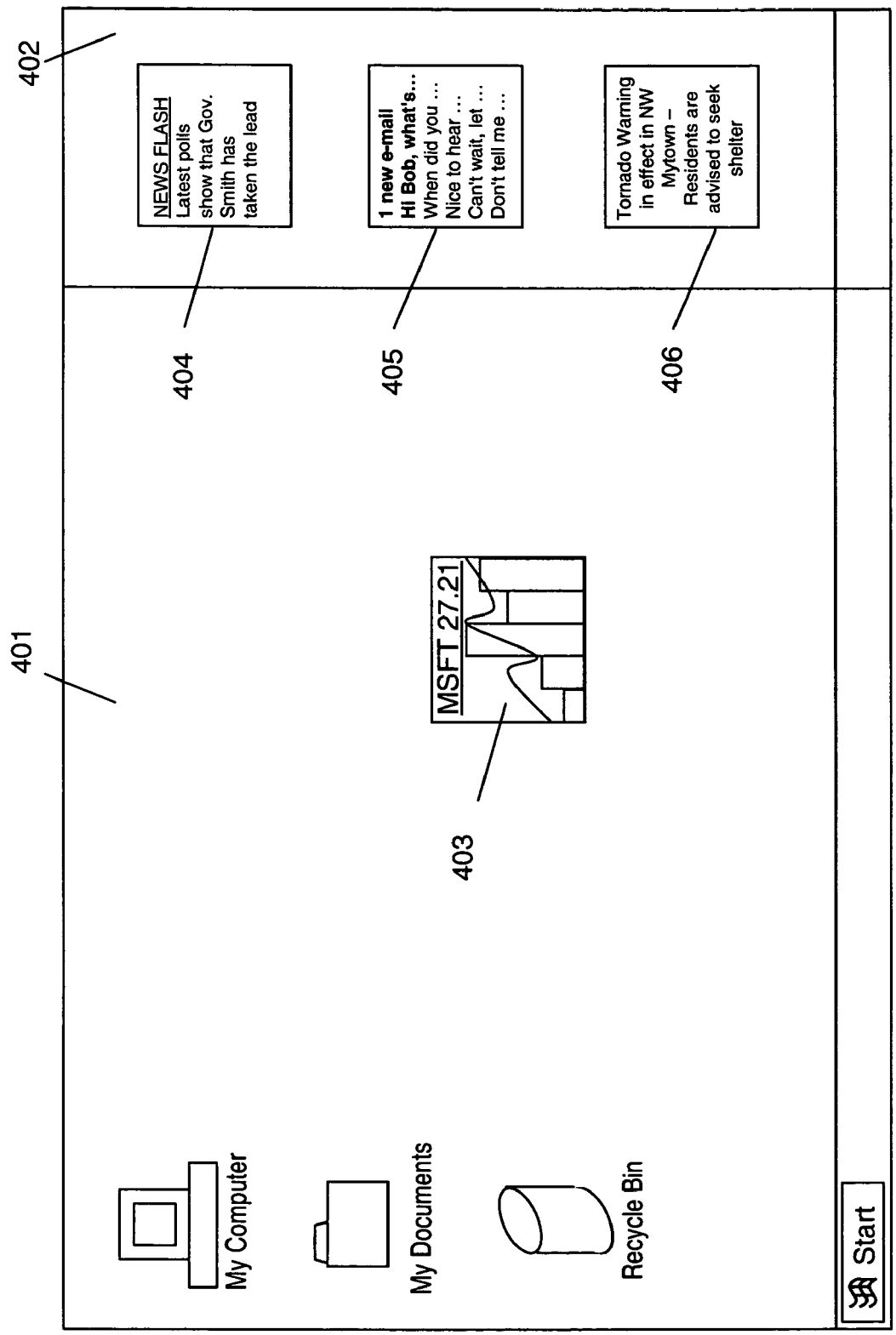

FIGS. 4A-4C illustrate another example of an aspect of the present invention in which an independent user interface from a designated area on a display is moved outside of the designated area to the general desktop region. FIG. 4A illustrates a display 401 with a designated area 402 containing four independent user interfaces (403, 404, 405 and 406). The independent user interfaces (403, 404, 405, and 406) in this example, provide dynamic information that may be updated such that the independent user interfaces (403-406) provides updated and current information to the user. An independent user interface 403 is moved from the designated area 402 to outside of the designated area 402 as indicated by the arrow (i.e., the general desktop region). FIG. 4B illustrates the first independent user interface 403 moved from its location in the designated area 402 to a location on the display 401 outside of the designated area 402 or the general desktop region. In this example, the first independent user interface 403 is moved out of the designated area 402 by dragging it with a cursor 407. In this example, independent user interface 403 provides the lastest and most recent stock price for MSFT. Thus, a user may determine if he/she wishes to buy/sell MSFT based on the current stock price as provided via the independent user interface 403.

Prior to positioning of the first independent user interface 403 at the location outside of the designated area 402, an empty space is present at the location within the designated area 402 from which the first independent user interface 403 was moved. After positioning of the first independent user interface 403 on the display 401, the other independent user interfaces (404, 405, and 406) within the designated area 402 are automatically rearranged in the designated area 402 based on the available space within designated area 402 and the number and size of the independent user interfaces (404-406). FIG. 4C illustrates the display 401 after the first independent user interface 403 is positioned on the display 401 in the general desktop region. The other independent user interfaces (404, 405, and 406) have rearranged in the designated area to provide substantially evenly spaced independent user interfaces and to eliminate the empty gap left behind by the first independent user interface 403. During this process, the independent user interfaces (403-406) continue to provide updated information to the user. For example, independent user interface 406 warns the user of the possibility of tornados under the current weather conditions.

Figure 5A:
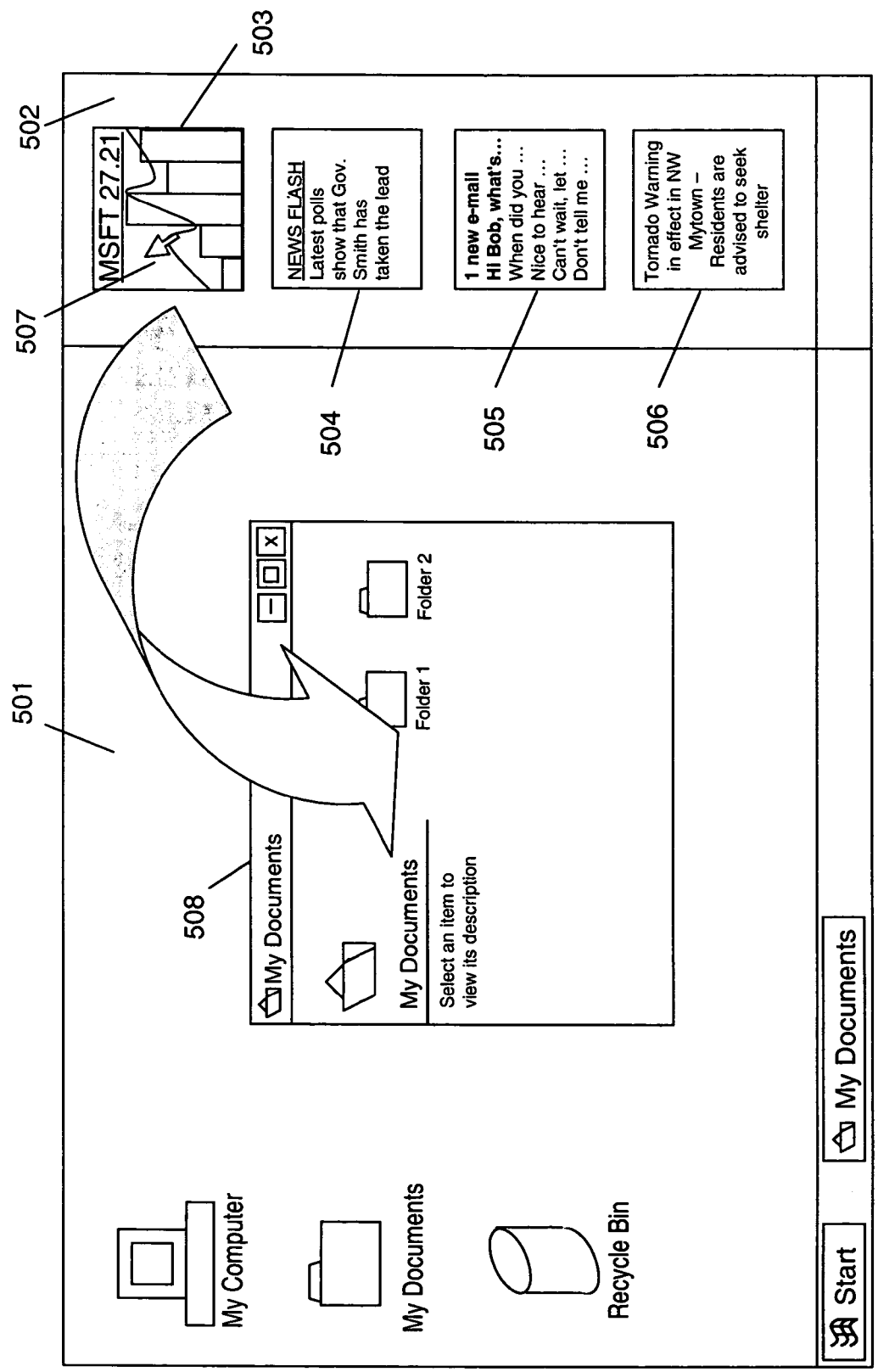
FIGS. 5A-5D illustrate an example of an aspect of the present invention in which an independent user interface is moved from a designated area on a display to a location outside of the designated area that contains another display element.
Figure 5B:
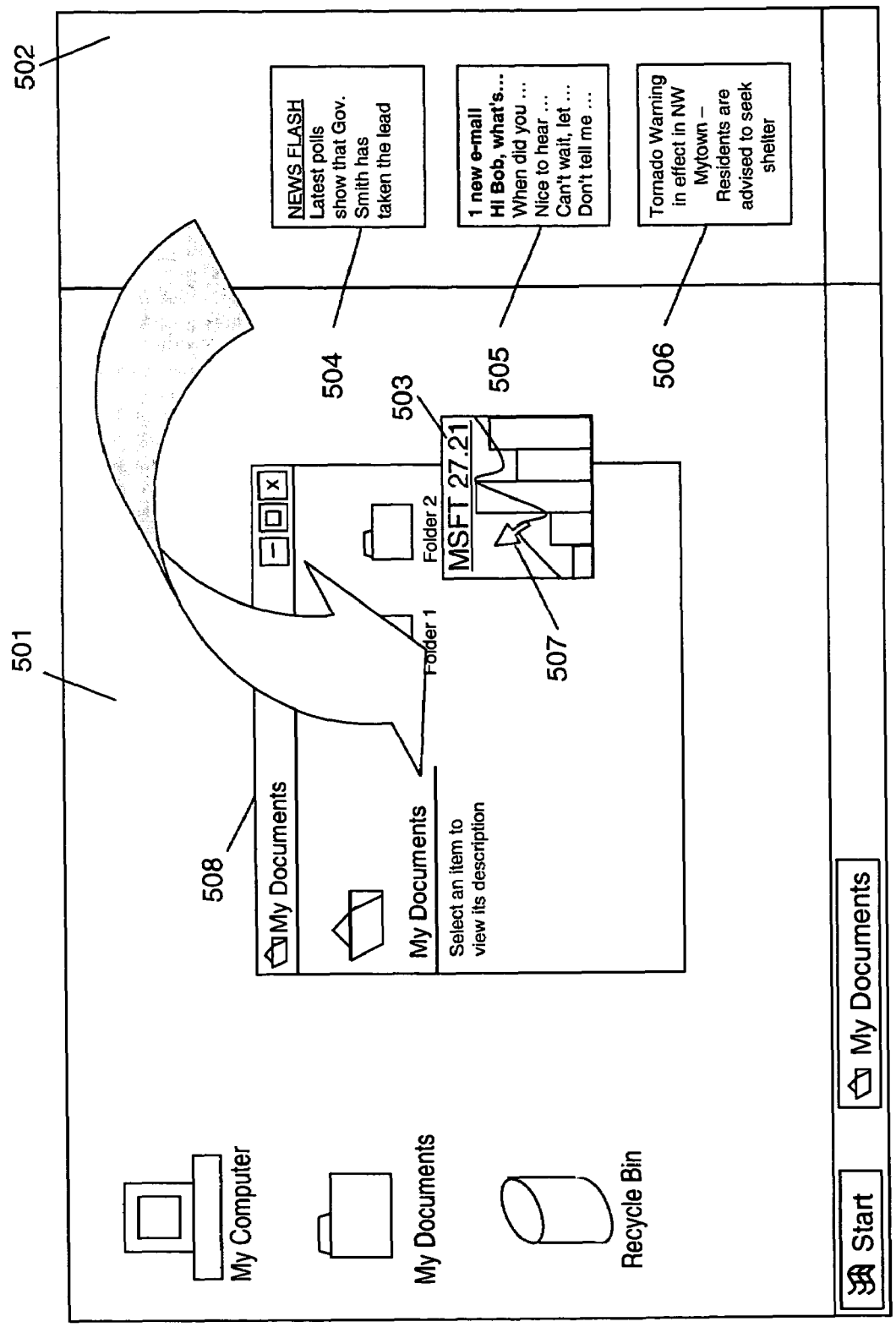

FIGS. 5A-5D illustrate an example of an aspect of the present invention in which an independent user interface is moved from a designated area on a display to a location outside of the designated area (i.e., the general desktop region) that contains another display element. For example, an independent user interface, while provide dynamic information to a user, may be dragged from a designated area onto a desktop or display at a location where a window is currently being displayed. FIG. 5A illustrates a display 501 with a designated area 502 containing four independent user interfaces (503, 504, 505 and 506). The independent user interfaces (503-506) provide updated dynamic information to the user such as stock information, weather information, news or sports information, auction information, instant messaging or mailbox information, etc. The display also contains a window 508. As seen in FIG. 5B, an independent user interface 503 (providing the latest stock price for MSFT in this example) may be moved from the designated area 502 to a location outside of the designated area 502 (i.e., the general desktop region) and overlapping the window 508 as indicated by the arrow. In this example, the independent user interface 503 is moved by dragging it with a cursor 507. Prior to positioning of the independent user interface 503 at the location outside of the designated area 502 (i.e., the general desktop region) and overlapping the window 508, an empty space remains at the location within the designated area 502 from where the independent user interface 503 was moved.

Positioning of the independent user interface in relation to other display elements may be controlled. For example, an independent user interface may be set to be "always-on-top" or "always-on-bottom". Adjusting the positioning of the independent user interfaces in relation to other display elements may be accomplished in a variety of ways. For example, setting the positioning of the independent user interface may be accomplished by selecting or clicking an icon or button. Also, a menu option may be selected, for example, from a pull-down menu or by right-clicking to view a pop-up menu.

Figure 5C:
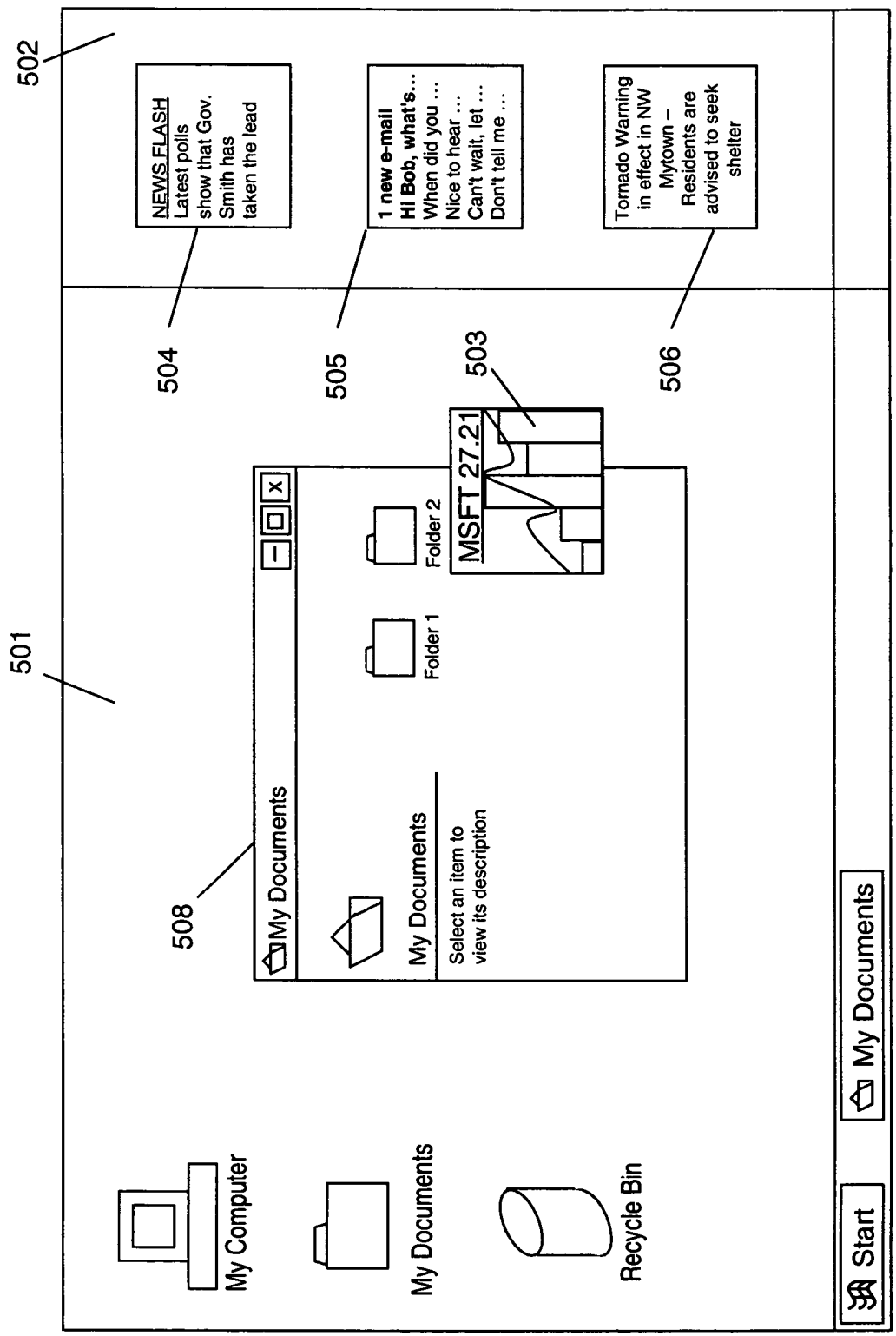

FIG. 5C illustrates positioning of the independent user interface 503 (which provides stock price information for MSFT in this example) when the independent user interface 503 is set to "always-on-top". In this example, the independent user interface 503 is set to "always-on-top" so that the independent user interface 503 is displayed on top of other display elements such as the window 508. In this way, the independent user interface 503 is not obscured by the window 508. FIG. 5C illustrates a display after positioning of the independent user interface outside of the designated area 502. The other independent user interfaces (504, 505, and 506) are automatically rearranged in the designated area 502 such that the empty space left from the movement of the independent user interface 503 is removed. Also, the independent user interface 503 is set to "always-on-top" so that the independent user interface 503 is displayed on top of window 508.

Figure 5D:
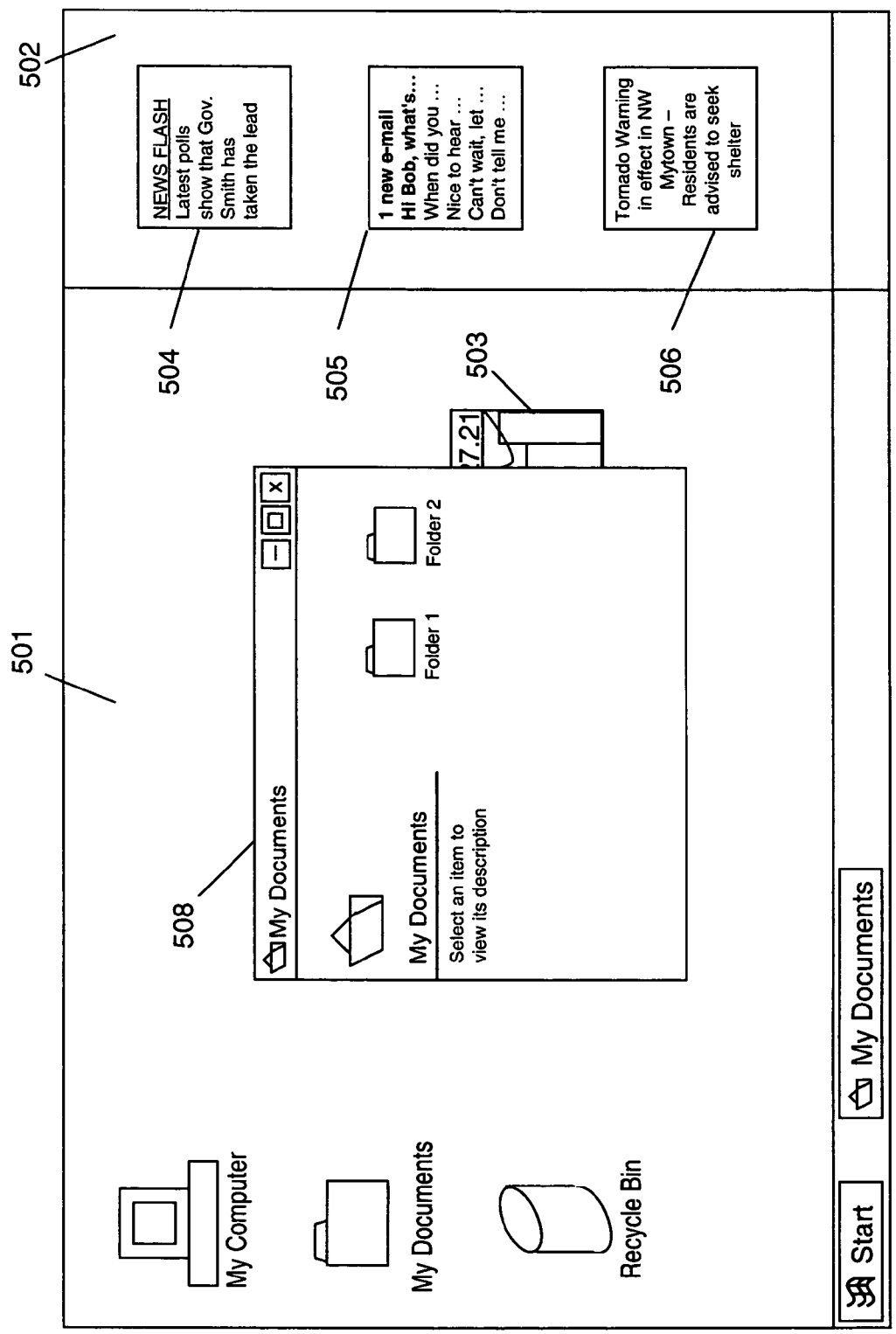

In another example, the independent user interface 503 is set to "always-on-bottom" such that the independent user interface 503 is displayed in back of other display elements, such as the window 508. In this example, the independent user interface 503 is obscured by the overlying window 508. FIG. 5D illustrates positioning of the independent user interface 503 on the display 501 outside of the designated area 502 when the independent user interface 503 is set to "always-on-bottom". As FIG. 5D illustrates, the independent user interface 503 is displayed in back of the window 508 such that access to the independent user interface 503 is obscured by the window 508.

Figure 6A:
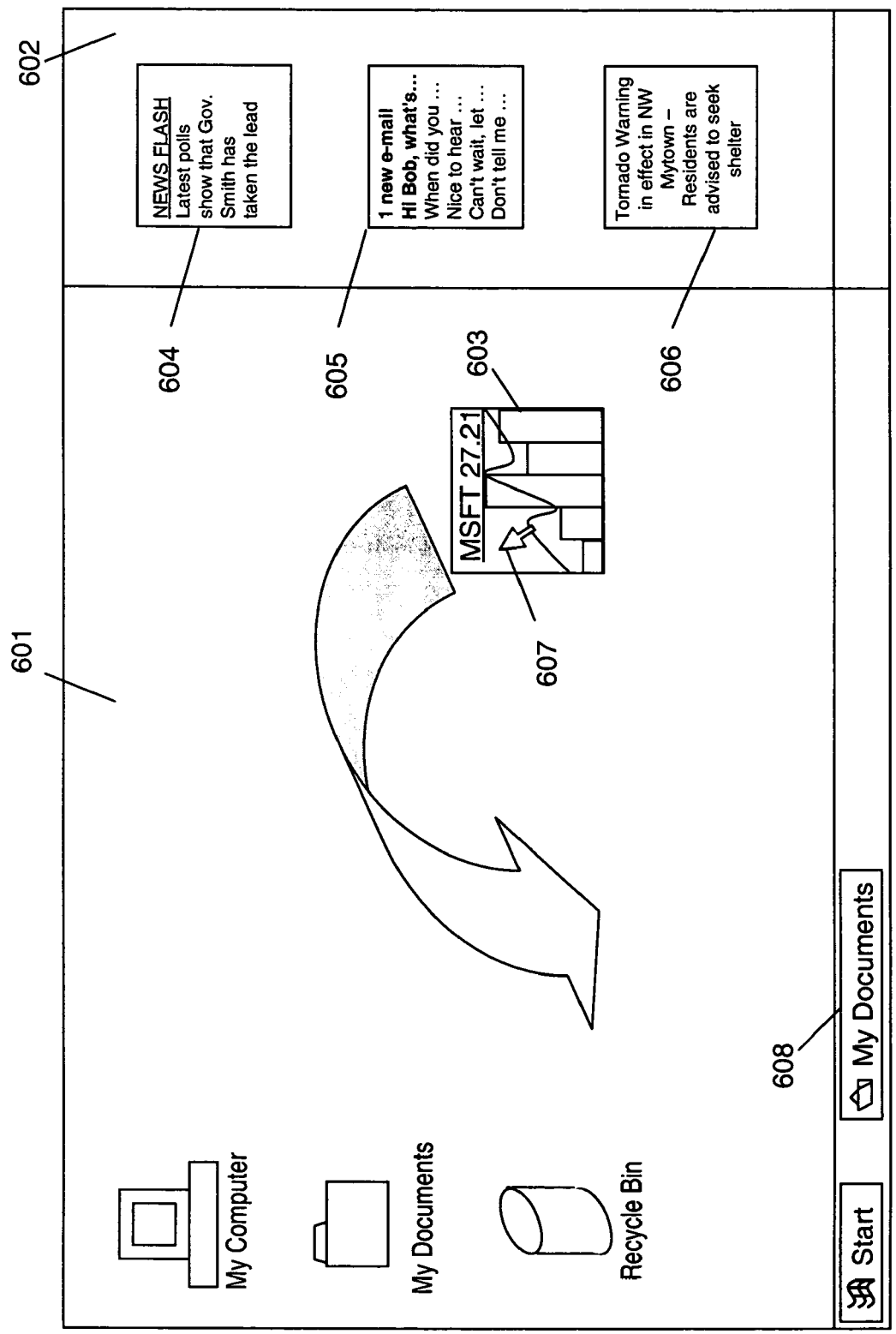
FIGS. 6A-6C illustrate another example of an aspect of the present invention in which an independent user interface may be moved from a designated area on a display and may be set to "always-on-bottom", however, the independent user interface may be viewed while repositioning on the display.

In another example, an independent user interface moved from a designated area on a display may be set to "always-on-bottom", however, the independent user interface may be viewed while repositioning on the display. FIG. 6A illustrates an independent user interface 603 that has been moved from a designated area 602 on a display 601 and positioned at the location out of the designated area 602 on the display 601 (i.e., the general desktop region). The independent user interface 603 provides stock price information for MSFT in this example. Likewise, the other independent user interfaces (604-606) also provide dynamic information that can be updated frequently. The independent user interfaces in the designated area (604, 605, and 606) are automatically rearranged in the designated area 602 such that they are substantially evenly spaced. The independent user interface 603 that is positioned at a location out of the designated area 602 is re-positioned as indicated by the arrow in FIG. 6A. During re-location of the independent user interface 603, an overlying window (not shown) is minimized. This is indicated in FIG. 6A by the taskbar button 608 illustrating the minimized "My Documents" window. Hence, in this example, the window "My Documents" is minimized during movement of the underlying independent user interface 603 that is set to "always-on-bottom" thus making the independent user interface 603 visible to the user. In this example, the independent user interface 603 is moved via a cursor 607 by dragging the independent user interface 603 to the new location.

As the preceding examples illustrate, independent user interfaces may have a display priority with respect to other display elements. For example, when an independent user interface has a display priority of "always-on-bottom", then priority of display may be assigned to other display elements, such as other open windows on the display. In this example, the display priority of the independent user interface is "always-on-bottom" such that other display elements have higher display priority and are displayed in front of the independent user interface. Conversely, if the display priority of the independent user interface is "always-on-top", then the display priority of the independent user interface is higher than that of the other display elements. In this case, the independent user interface (with higher display priority) is displayed in front of other display elements with lower display priority.

In another aspect of the present invention, an independent user interface positioned at a location outside of a designated area on a display may be moved to another location outside of the designated area. FIG. 6A illustrates an example in which an independent user interface 603 is set to "always-on-bottom" and is moved from one location on the display 601 that is outside of the designated area 602 to another location on the display 601 that is also outside of the designated area 602. As FIG. 6A illustrates, a window 608 (not shown) is present on the display. Because the independent user interface 603 is set to "always-on-bottom", the independent user interface 603 is obscured by the window 608 (not shown) similar to FIG. 5D. However, in this example, the independent user interface 603 is moved from one location to another location on the display 601 outside of the designated area 602. The window 608 (not shown) minimized while the independent user interface 603 is moved such that the independent user interface 603 is freely displayed. Thus, movement of the independent user interface 603 is unimpeded by the overlying window 608 (not shown).

Figure 6B:
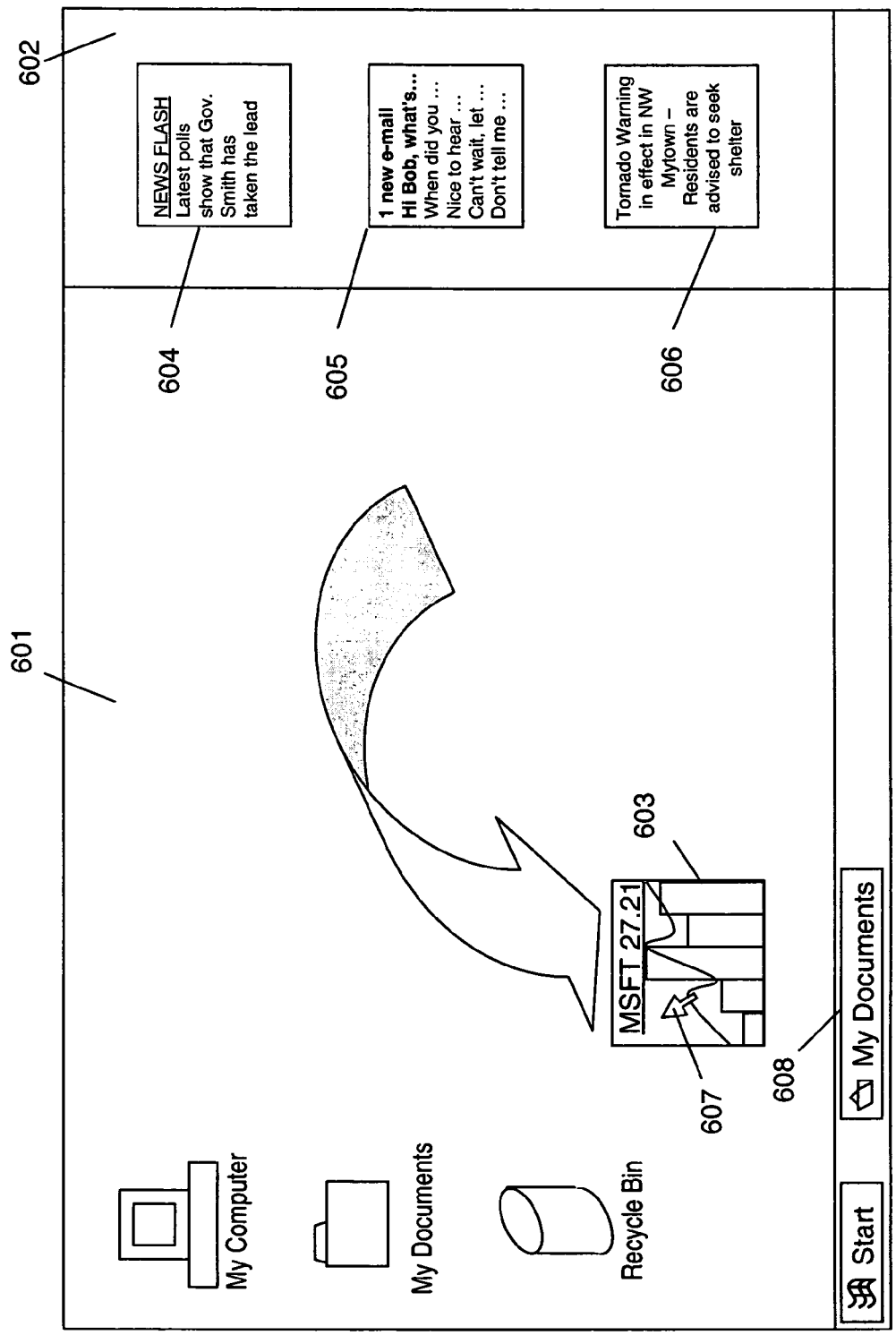

FIG. 6B illustrates an example of movement of an independent user interface 603 set to "always-on-bottom" from one location on a display outside of a designated area 602 where the independent user interface 603 is obscured by a window 608. As in the previous example, the window 608 is minimized while the independent user interface 603 is being moved. FIG. 6B shows the independent user interface 603 has been moved to the new location on the display 601 but has not yet been positioned. The window "My Documents" is still minimized in this example as the independent user interface 603 has not yet been positioned. The independent user interface 603 in this example is moved by dragging a cursor 607. The minimized window is indicated by the taskbar button 608.

Figure 6C:
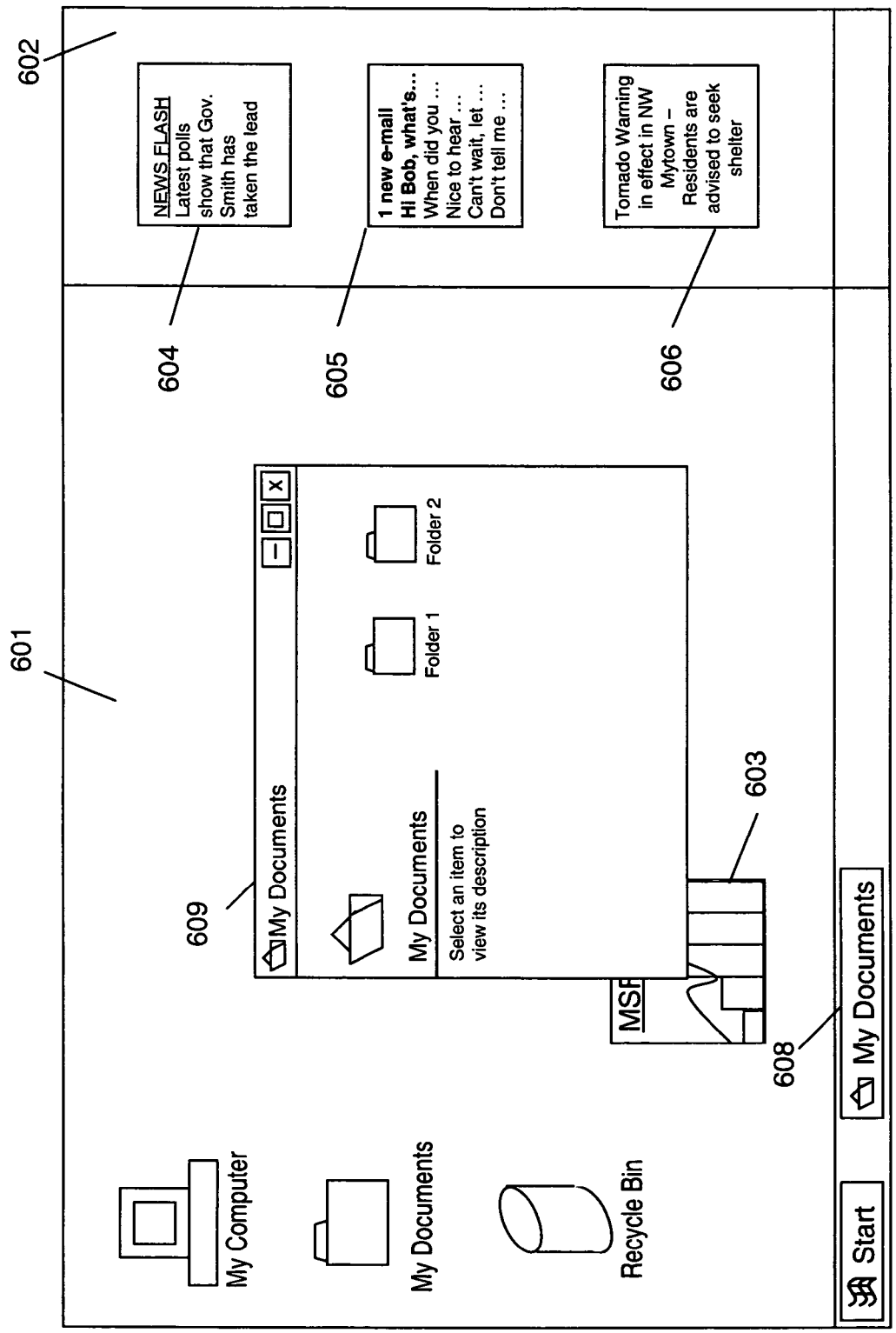

FIG. 6C illustrates the independent user interface 603 after positioning on the display 601 at a location out of the designated area 602 on the general desktop region. After placement of the independent user interface 603 which has been set to "always-on-bottom", the overlying display elements (e.g., the window 609) is restored. In this example illustrated in FIG. 6C, the window 609 overlaps and partially obscures the independent user interface 603, which was set to "always-on-bottom", however, during re-positioning of the independent user interface 603, the overlying window 609 was minimized to permit visual access to the independent user interface 603. Accidental restoration of overlying display elements may be avoided by implementing a delay between positioning of the independent user interface 603 on the display and restoration of the minimized display elements. The delay may be adjusted, determined or controlled based on user preference.

Figure 7:
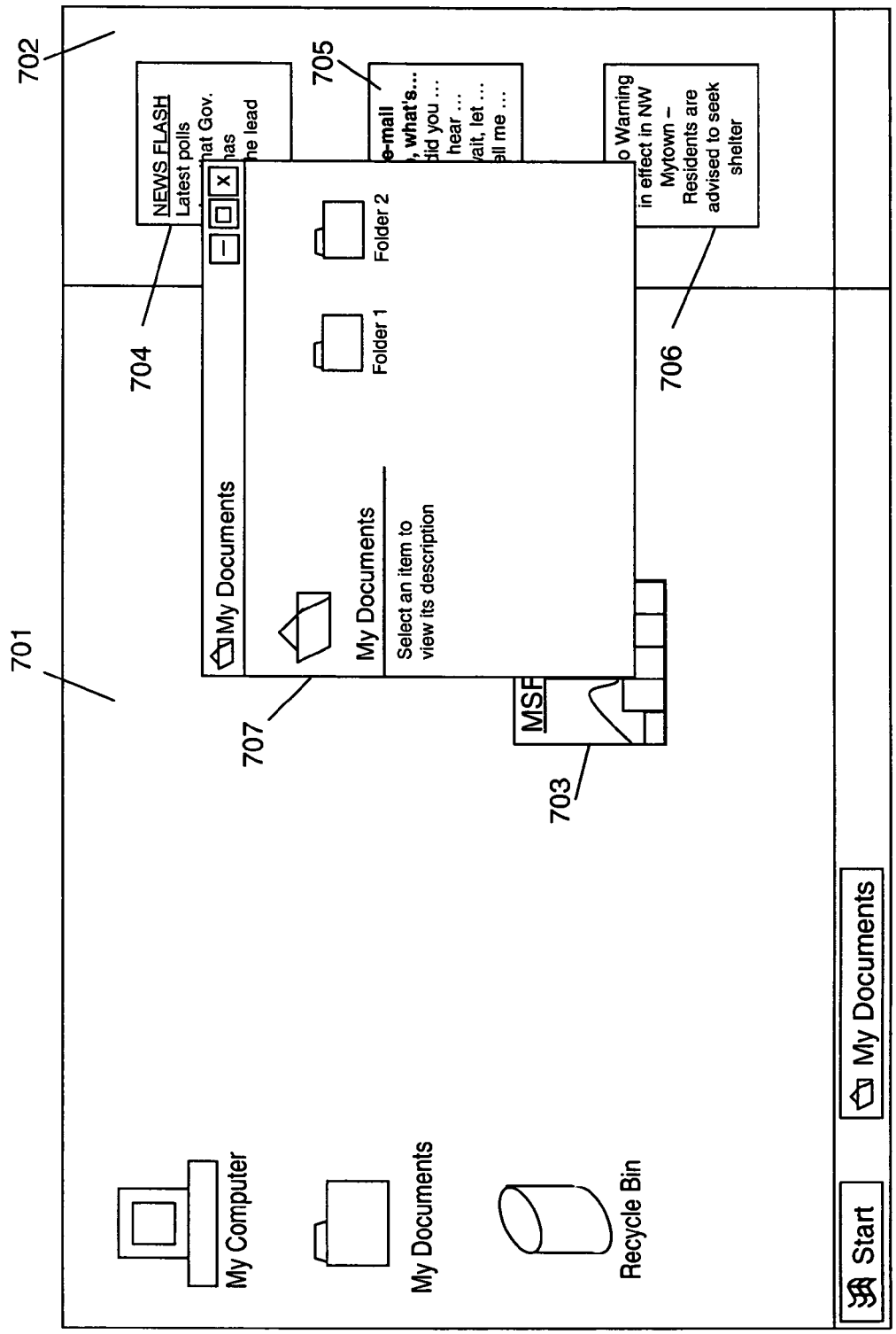
FIG. 7 illustrates an example of an aspect of the present invention in which the designated area on the display is set to "always-on-bottom".

In addition to setting an independent user interface to "always-on-bottom" or "always-on-top" as described, the designated area itself may be set to "always-on-bottom" or "always-on-top". FIG. 7 illustrates an example of an aspect of the present invention in which the designated area 702 on the display 701 is set to "always-on-bottom". An independent user interface 703 has been moved from the designated area 702 and positioned on the display 701 at a location out of the designated area 702. The independent user interfaces (704, 705, and 706) in the designated area 702 have been re-arranged such that they are substantially evenly spaced. In this example, the designated area 702 and the independent user interfaces (703, 704, 705, and 706) have been set to "always-on-bottom". Hence, the overlying window 707 is displayed on top of the designated area 702 and independent user interfaces (703, 704, 705, and 706).

Figure 8:
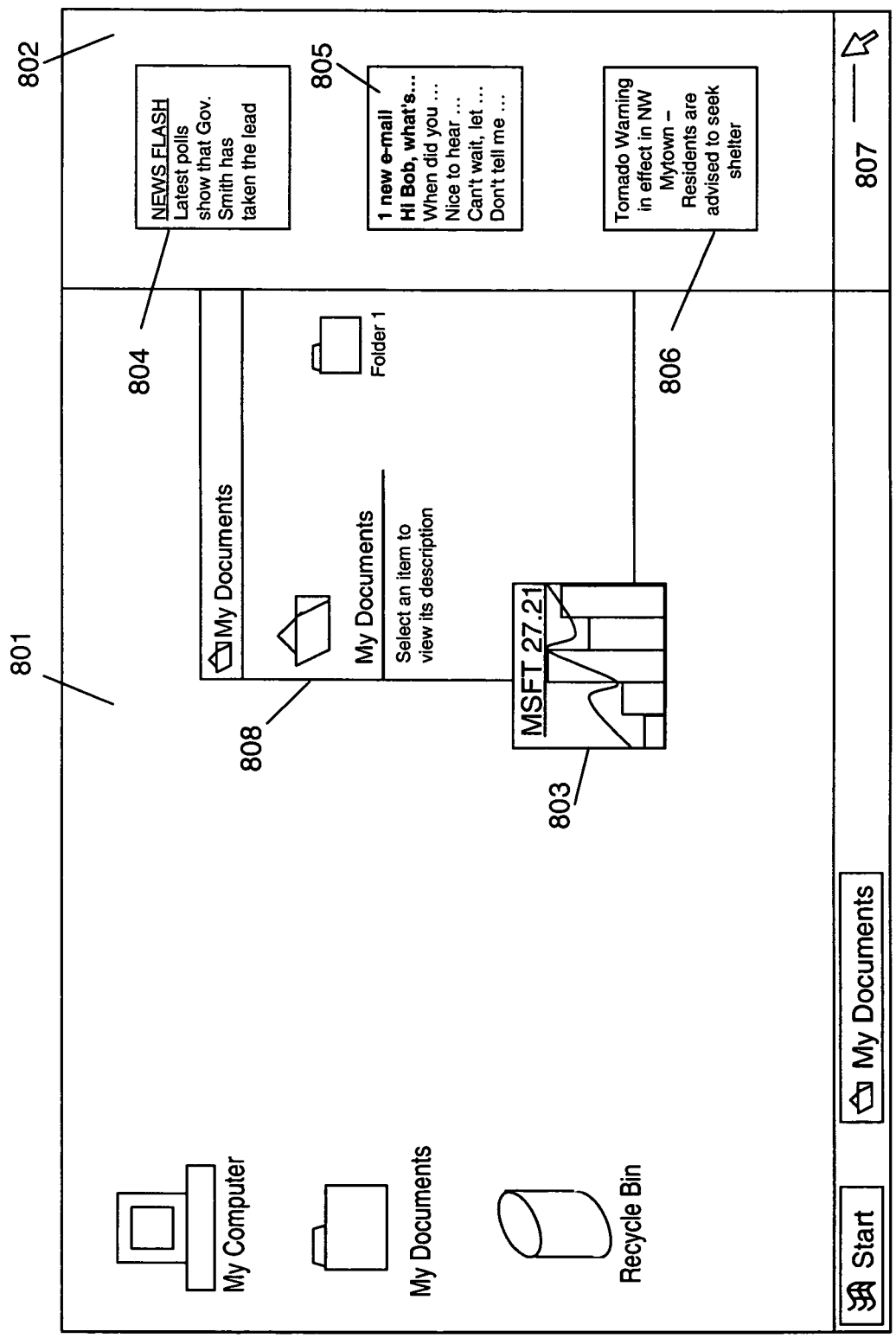
FIG. 8 illustrates another example of an aspect of the present invention in which access to independent user interfaces and the designated area is achieved through temporary display of the independent user interfaces and the designated area on top of overlying display elements.

FIG. 8 illustrates another example of an aspect of the present invention. A display 801 contains a designated area 802 which contains independent user interfaces (804, 805, and 806). The independent user interfaces (804-806) in this example may provide dynamic information such as stock, weather, news, sports, instant messaging and mailbox information. The dynamic information provided by the independent user interfaces may be frequently updated or modified to reflect the latest available information. Independent user interface 803 (which provides stock price information in this example) has been moved from the designated area 802 to a location on the display 801 out of the designated area 802 while the independent user interfaces (804, 805, and 806) have re-arranged automatically such that the independent user interfaces (804, 805, and 806) are substantially evenly spaced. In this example, the designated area 802 and the independent user interfaces (803, 804, 805, and 806) are set to "always-on-bottom" such that other display elements, such as the window 808, are displayed on top of the designated area 802 and the independent user interfaces (803, 804, 805, and 806).

However, in the example illustrated in FIG. 8, visual access to the independent user interfaces (803, 804, 805, or 806) and the designated area 802 is achieved by causing temporary display of the designated area 802 or the independent user interfaces (803, 804, 805, or 806) on top of the overlying window 808. Thus, in this example, if independent user interfaces (e.g., 803, 804, 805, or 806) are obscured by other display elements, the independent user interfaces (803, 804, 805, or 806, e.g.) may be temporarily brought to the front of the display such that dynamic information (i.e., information that may be updated to reflect the most current information available) may be continued to be provided.

As demonstrated in the example of FIG. 8, a cursor 807 hovers over a predetermined area on the display 801 which causes the designated area 802 (which has been set to "always-on-bottom") to be displayed on top of the overlying window 808. In this example, the predetermined area is at the bottom portion of the designated area 802, however, the invention is not so limited as the predetermined area may be at any convenient location on the display 801. In addition, the designated area 802 may be restored to "always-on-bottom" display priority such that the window 808 may be displayed in front of the designated area 802. This may be accomplished in a variety of ways. For example, the cursor 807 may be moved to a location away from the predetermined area which causes the designated area 802 to be displayed on top of the overlying window 808. In this example, the cursor 807 may be moved, for example, to the general desktop region such that the display priorities of the designated area 802 and other display elements (e.g., window 808) may be restored to their original status. Alternatively, restoring display priority of display elements may be achieved by selection of a menu option or by selecting an icon or other user interface graphic.

Also illustrated in FIG. 8 is the independent user interface 803 which is also temporarily displayed on top of the overlying window 808 when the cursor 807 hovers over the predetermined location on the display 808. The independent user interface 803 in this example provides dynamic information pertaining to the stock price of MSFT. Thus, FIG. 8 demonstrates an example of an independent user interface 803 given temporary display priority such that the independent user interface 803 may be temporarily displayed in front of other display elements. By having temporary display priority, the independent user interface 803 is temporarily displayed in front of other display elements to provide dynamic information to a user without interference with other display elements that temporarily have lower display priority than the independent user interface 803. As set forth above, the display priority of the independent user interface 803 may be restored (e.g., after the dynamic information is no longer desired) so that the independent user interface 803 is displayed in back of the other display elements by a variety of methods including but not limited to moving the cursor 807 away from the predetermined location, selection of an icon or graphic image to set the display priority of the independent user interface 803 or selection of a menu option to determine the display priority, to name a few.

Figure 9A:
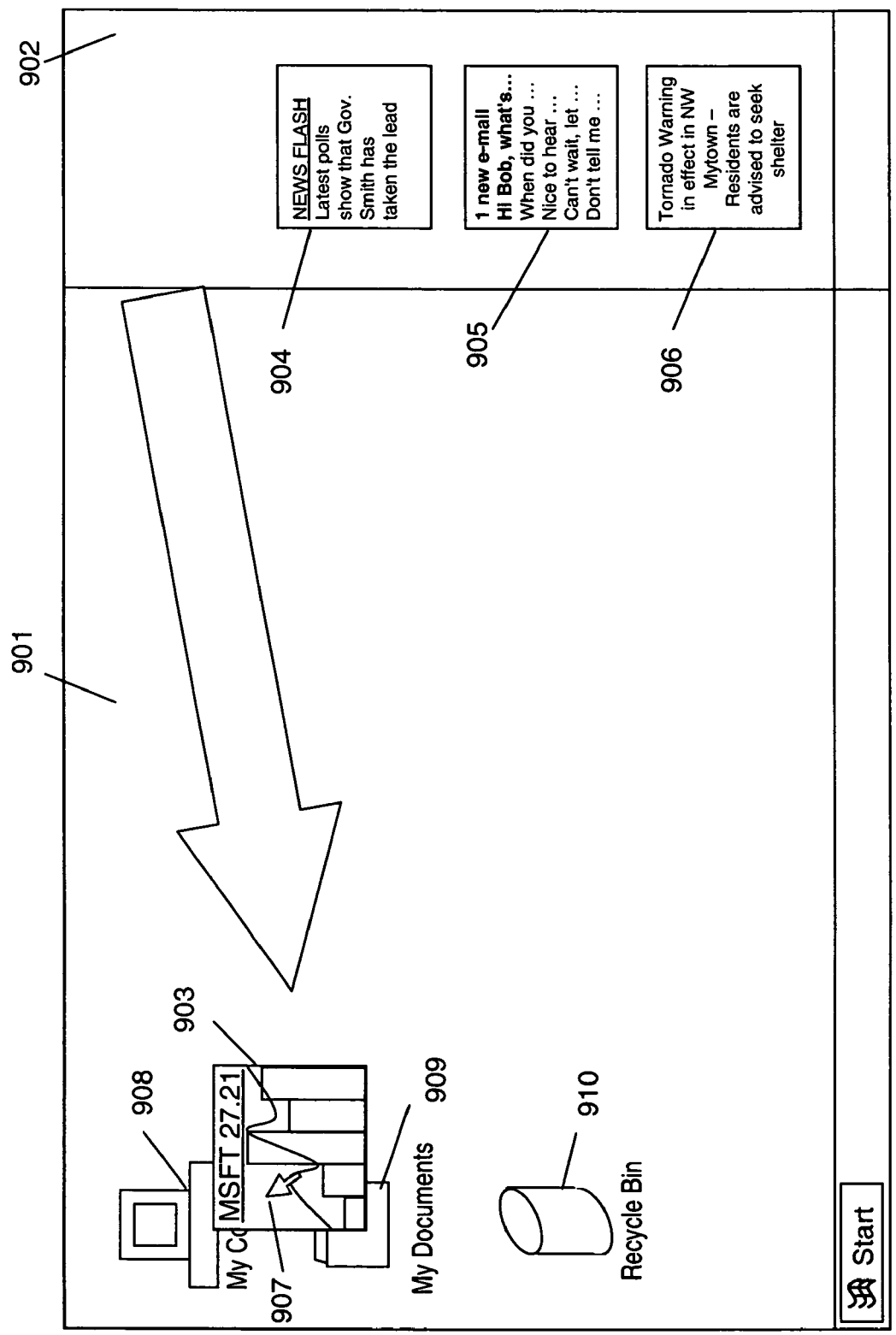
FIGS. 9A-9B illustrate another example of an aspect of the present invention in which an independent user interface may be moved from a designated area on a display to a location outside of the designated area such that the independent user interface interacts with desktop icons.

An independent user interface may also be moved from a designated area on a display to a location outside of the designated area (i.e., the general desktop region) such that the independent user interface is moved to an area in the general desktop region containing desktop icons. FIG. 9A illustrates a display 901 with a designated area 902 that contains independent user interfaces (903, 904, 905, and 906). As in the previous examples, the independent user interfaces (903, 904, 905 and 906) contain dynamic information which can be updated periodically to provide the latest and most current information. Independent user interface 903 (which provides stock price information in this example) is moved from the designated area 902 to a location outside of the designated area 902 (i.e., the general desktop region). In this example, the independent user interface 903 is moved from the designated area 902 by dragging it with a cursor 907 to the general desktop region.

Prior to positioning of the independent user interface 903 at the location outside of the designated area 902 on the display (i.e., in the general desktop region), the independent user interfaces (904, 905 and 906) remaining in the designated area 902 are not evenly spaced because an empty space remains where the independent user interface 903 being moved from the designated area 902 used to reside. In this example, the independent user interface 903 being moved to the location outside of the designated area 902 is being placed at a location over a desktop icon (e.g., 908, 909 or 910) in the general desktop region. Prior to positioning of the independent user interface 903, there is overlap of the independent user interface 903 with desktop icons (908 and 909) as illustrated in FIG. 9A.

Figure 9B:
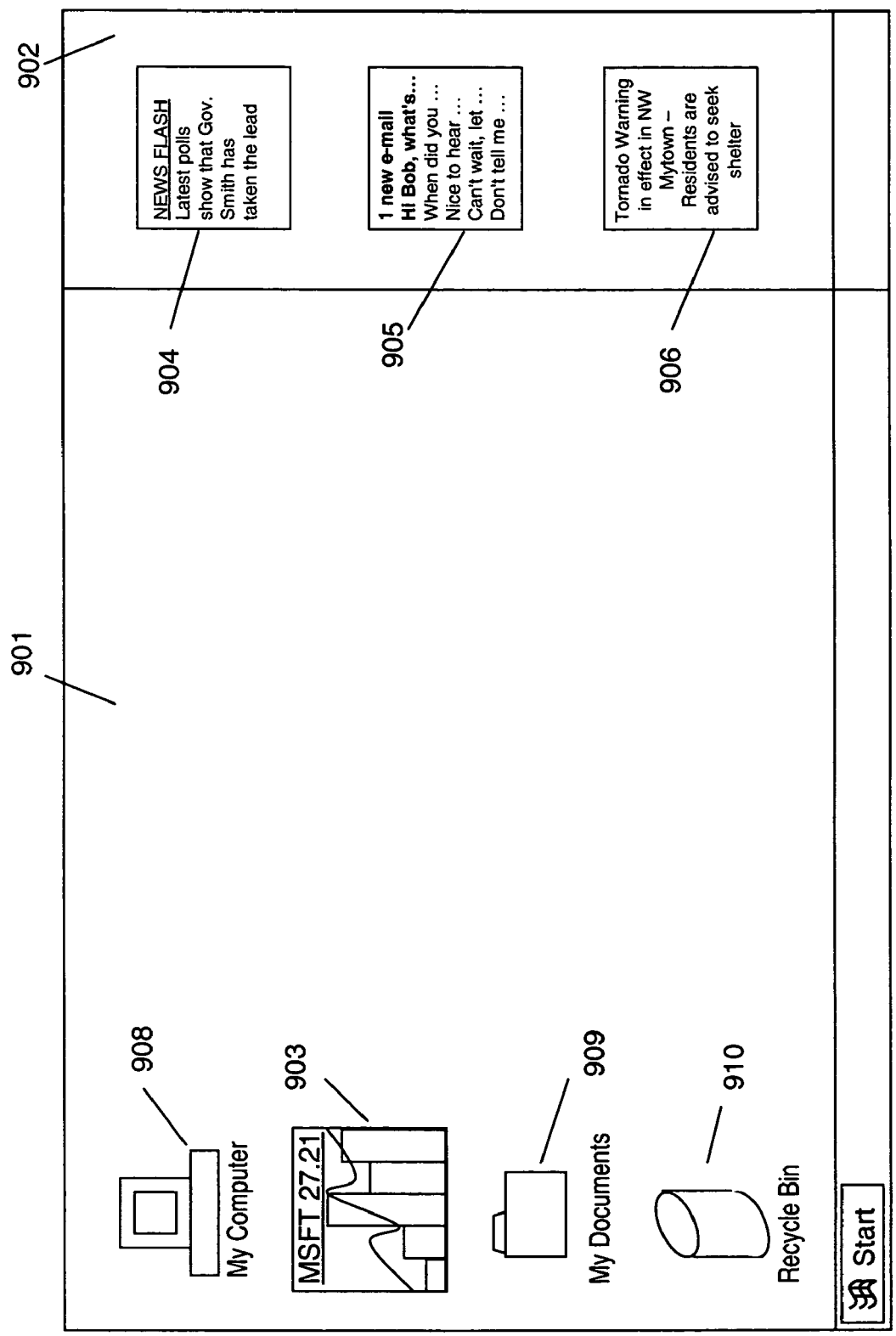

FIG. 9B illustrates the display 901 after positioning of the independent user interface 903. The independent user interfaces (904, 905, and 906) in the designated area 902 rearrange automatically in the designated area 902 such that the independent user interfaces (904, 905, and 906) are substantially evenly spaced. Independent user interface 903 is placed on the display 901 at a location outside of the designated area 902 but overlapping desktop icons (903, 909 and 910). Desktop icons provide a graphical depiction of an application or folder that provides access to that application/folder, however, desktop icons to not provide dynamic information. In this example, access to folders or information on the local computer (e.g., the recycle bin) may be necessary to maintain while also maintaining access to the dynamic information contained in the independent user interface. Because access to the latest, updated information (dynamic information) provided in the independent user interface may be desired simultaneously with the ability to access files on the local computer via desktop icons, the desktop icons and the independent user interfaces do not obscure each other in this example.

To avoid conflicts between the dynamic information provided in the independent user interface and the folder and file access provided by the desktop icons in this example, after positioning of the independent user interface 903 on the display 901, the icons (908, 909 and 910) rearrange such that the independent user interface 903 is present on the display but does not overlap the desktop icons (908, 909 and 910, respectively). The desktop icons (908, 909, and 910, for example) automatically reflow around the independent user interface 903. Thus, as FIG. 9B illustrates, the independent user interface 903 does not obscure the desktop icons (908, 909 and 910). Also, the desktop icons (908, 909 and 910) and the independent user interface (903) are automatically rearranged to maintain an ordered appearance. The independent user interface 903 is rearranged with desktop icons and continues to provide dynamic information to the user even though the independent user interface 903 has been moved to the general desktop region. In this example, independent user interface 903 provides stock information, however, any independent user interface providing any dynamic information may be positioned on the general desktop region as described.

Figure 10A:
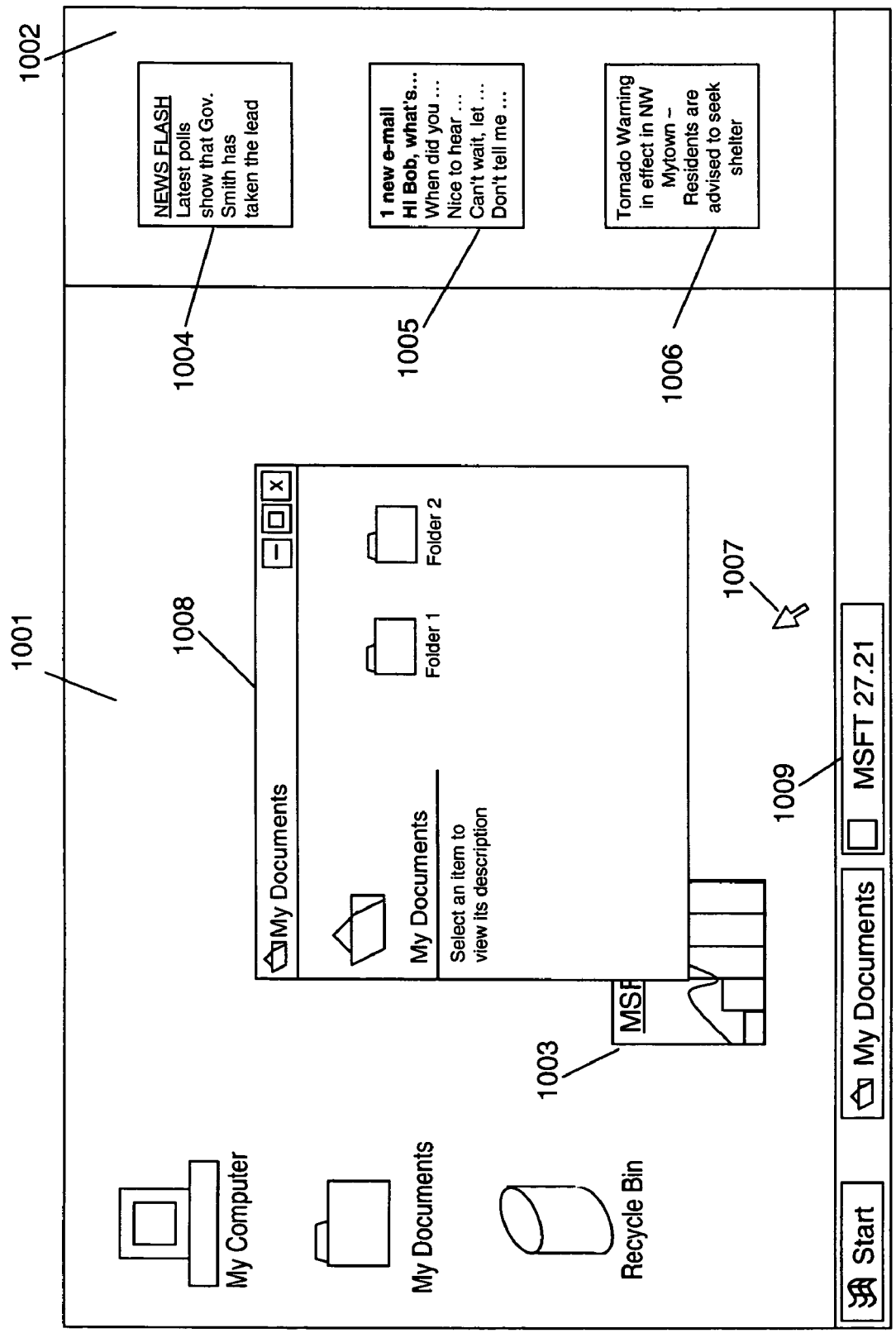
FIGS. 10A-10B illustrate another example of an aspect of the present invention in which an independent user is associated with a taskbar button.
Figure 10B:
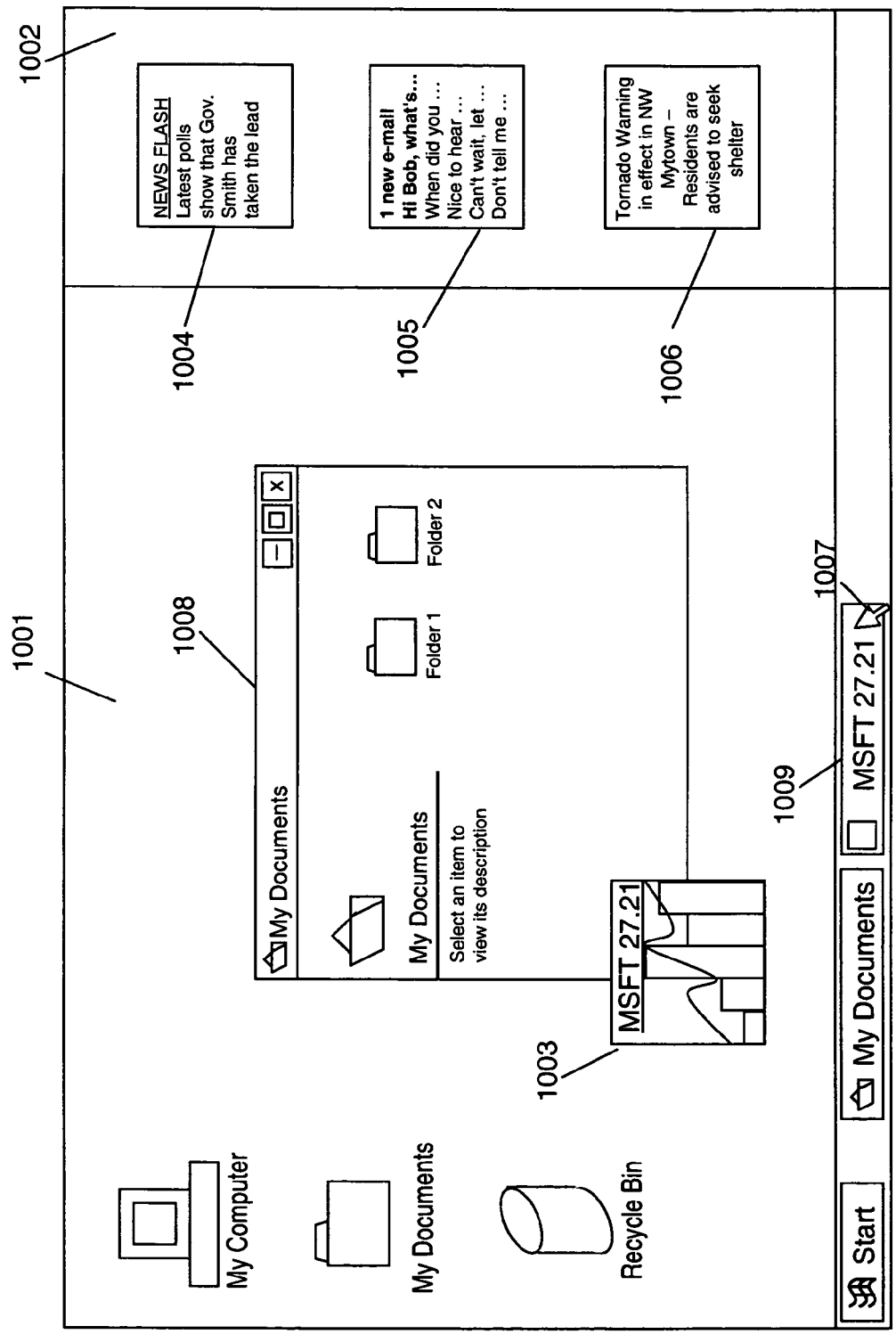

FIGS. 10A-10B illustrate another example of an aspect of the present invention. In this example, an independent user interface provides dynamic information and is placed on the display at a location outside of the designated area but the independent user interface is associated with a taskbar button. FIG. 10A illustrates a display 1001 containing a designated area 1002. The designated area 1002 contains independent user interfaces (1004, 1005, and 1006). Another independent user interface 1003 has been moved from the designated area 1002 and placed on the display 1001 at a location outside of the designated area 1002. The independent user interface 1003 is displayed in back of a window 1008 and is associated with a taskbar button 1009. For example, the independent user interface 1003 may be set to "always-on-bottom" such that the independent user interface 1003 will be displayed in back of overlying windows such as the window 1008. The taskbar button 1009 associated with the independent user interface 1003 may be selected and activated. For example, a cursor 1007 may be placed over the taskbar button 1009 and clicked.

As FIG. 10B illustrates, if the independent user interface 1003 is set to "always-on-bottom" and is displayed in back of another element, such as window 1008, then the taskbar button 1009 associated with the independent user interface 1003 may be selected or activated. For example, cursor 1007 may be placed over the taskbar button 1009 and an input device (not shown) may be activated (e.g., a mouse may be clicked). In this example, when the taskbar button 1009 is clicked, the associated independent user interface 1003 has gained display priority over the other display elements (e.g., the window 1008) and is displayed on top of the overlying window 1008.

Figure 11A:
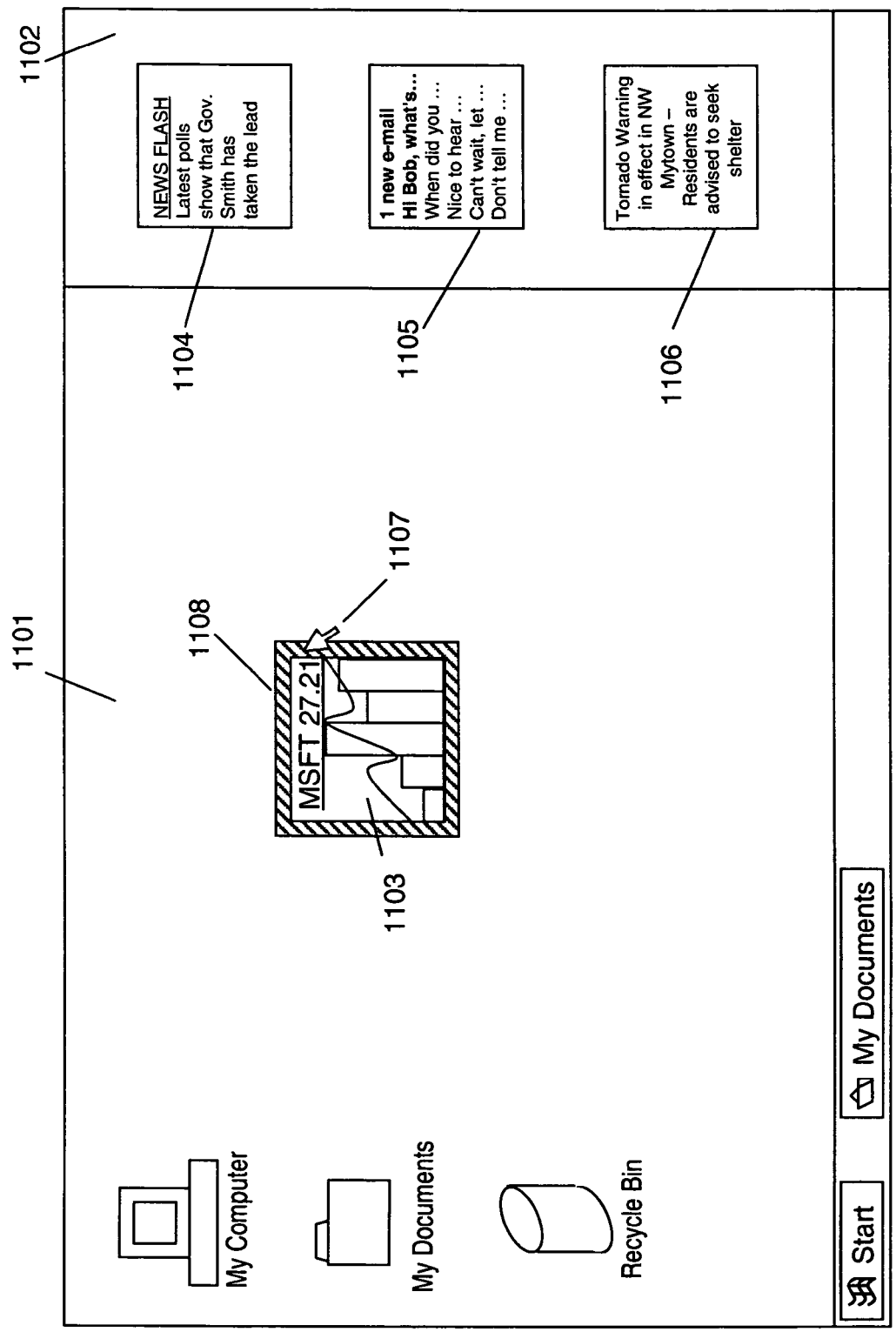
FIGS. 11A-11B illustrate an optional flyout for an independent user interface moved from a location in a designated area to a location on a display outside of the designated area.

In addition to providing dynamic information in the main body of the independent user interface, independent user interfaces may possess an optional flyout that may display additional content of the body of the independent user interface. When an independent user interface is moved from a location in a designated area on a display to a location outside of the designated area on the display, the optional flyout may be a clickable region along the edge of the independent user interface. FIG. 11A illustrates an example of the optional, clickable flyout of an independent user interface.

FIG. 11A shows a display 1101 containing a designated area 1102 that contains independent user interfaces (e.g., 1104, 1105, and 1106). Independent user interface 1003 has been moved from the designated area 1102 and positioned at a location on the display 1101 that is outside of the designated area 1102. The independent user interfaces (1104, 1105, and 1106) in the designated area rearrange automatically in the designated area 1102 such that the independent user interfaces (1104, 1105, 1106) are substantially evenly spaced.

FIG. 11A also illustrates the optional flyout clickable region 1108 surrounding the independent user interface 1103 that has been positioned on the display 1101 at a location outside of the designated area 1102. The flyout clickable region 1108 is depicted for illustration purposes in FIG. 11A as a cross-hatched region. FIG. 11A depicts the flyout clickable region 1108 as a region that completely surrounds the independent user interface 1103 however, the present invention is not so limited. The flyout clickable region 1108 may extend around all sides of the independent user interface 1103 as illustrated in FIG. 11A but may also extend around any single or multiple side of the independent user interface 1103 or portion thereof.

Figure 11B:
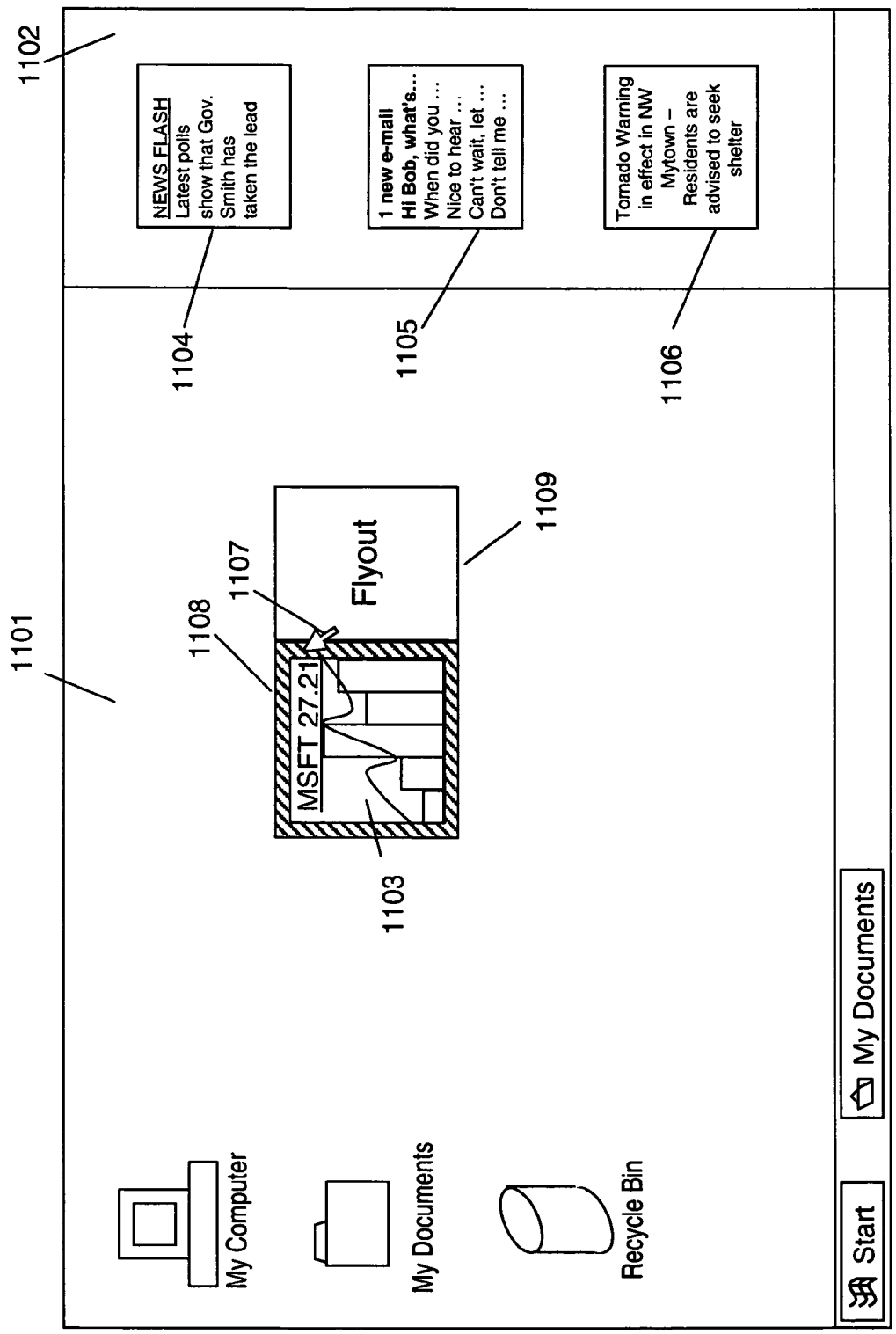

FIG. 11B illustrates the independent user interface 1103 after the flyout clickable region 1108 has been clicked. For example, the cursor 1107 is placed on the flyout clickable region and clicked. A flyout 1109 appears as a result of selecting or activating the flyout clickable region 1108 as illustrated in FIG. 11B. The flyout provides additional information or extra controls of the contents of the body of the independent user interface 1103. Such information in the flyout may depend on the content of the dynamic information provided in the body of the independent user interface 1103. For example, if the body of the independent user interface provides a current weather report, the flyout may contain, for example, a 5-day weather forecast or additional information not provided in the body of the independent user interface such as pollen count or relative humidity. If the body of the independent user interface provides a stock price for a particular security, the flyout may contain, for example, graphs or information on the 5-year, 3-year, or 1-year history of the security or ratings by analysts (e.g., a Morningstar rating). If the body of the independent user interface provides the current score in an ongoing sports event, the flyout may contain, for example, statistics on selected players. If the body of the independent user interface provides a current status on an ongoing auction, the flyout may contain, for example, information on the item being auctioned or controls for placing a bid on the item. These examples are not meant to limit the invention but rather to clarify the invention.

Figure 12A:
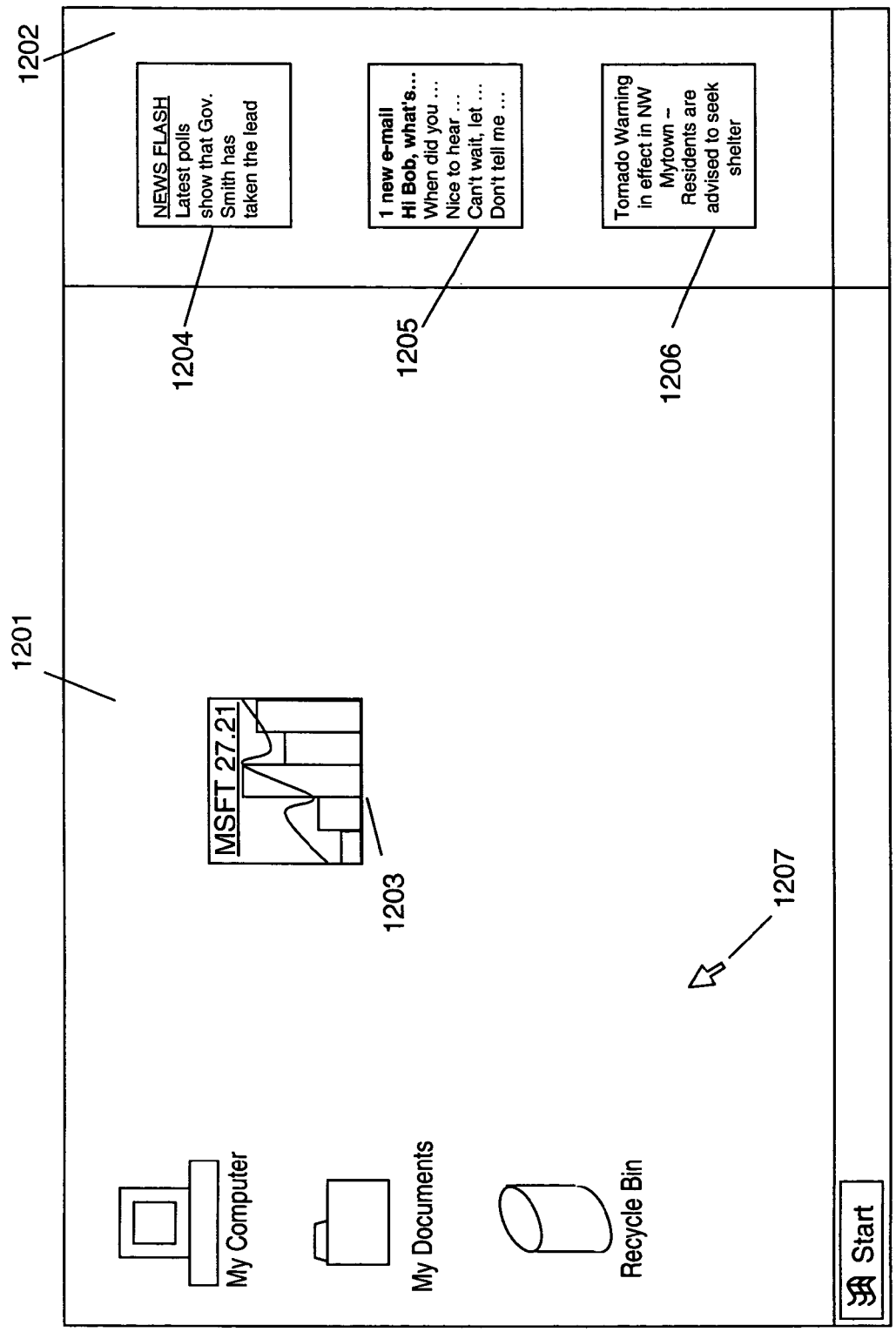
FIGS. 12A-12D illustrate an example of an aspect of the present invention in which an independent user interface is moved from a location on a display outside of the designated area to a location within the designated area.

FIGS. 12A-12D illustrate another example of an aspect of the present invention in which an independent user interface which provides dynamic information is moved from a location on a display outside of the designated area to a location within the designated area. As FIG. 12A illustrates, an independent user interface is displayed on a display 1201 at a location outside of the designated area 1202. The designated area 1202 contains other independent user interfaces (e.g., 1204, 1205, and 1206).

Figure 12B:
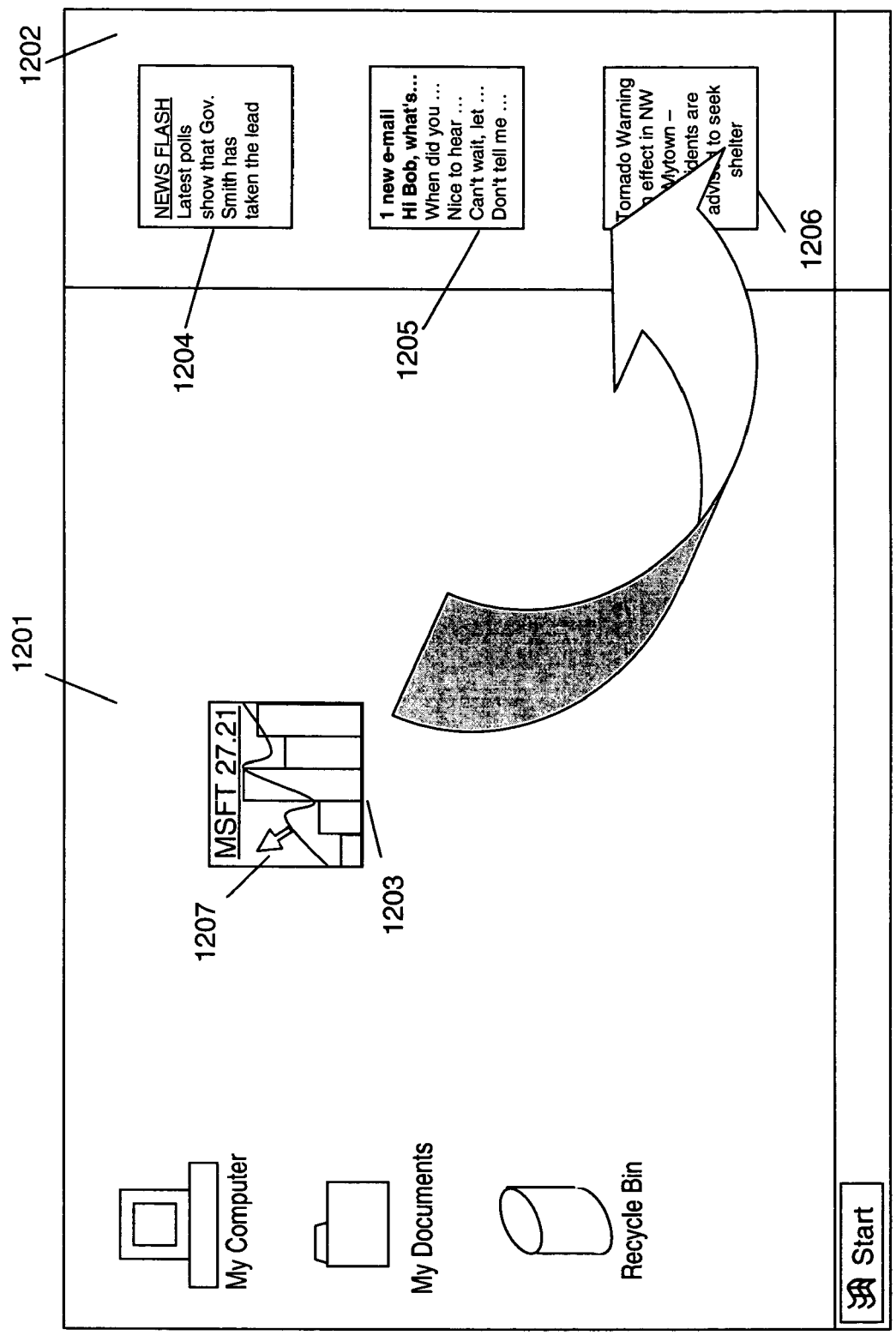

FIG. 12B illustrates the independent user interface 1207 on the display at location outside of the designated area 1202. The independent user interface 1207 is moved into the designated area 1202 as depicted by the large arrow. The independent user interface 1203 may be moved back into the designated area 1202, for example, by dragging the independent user interface 1203 with a cursor 1207.

Figure 12C:
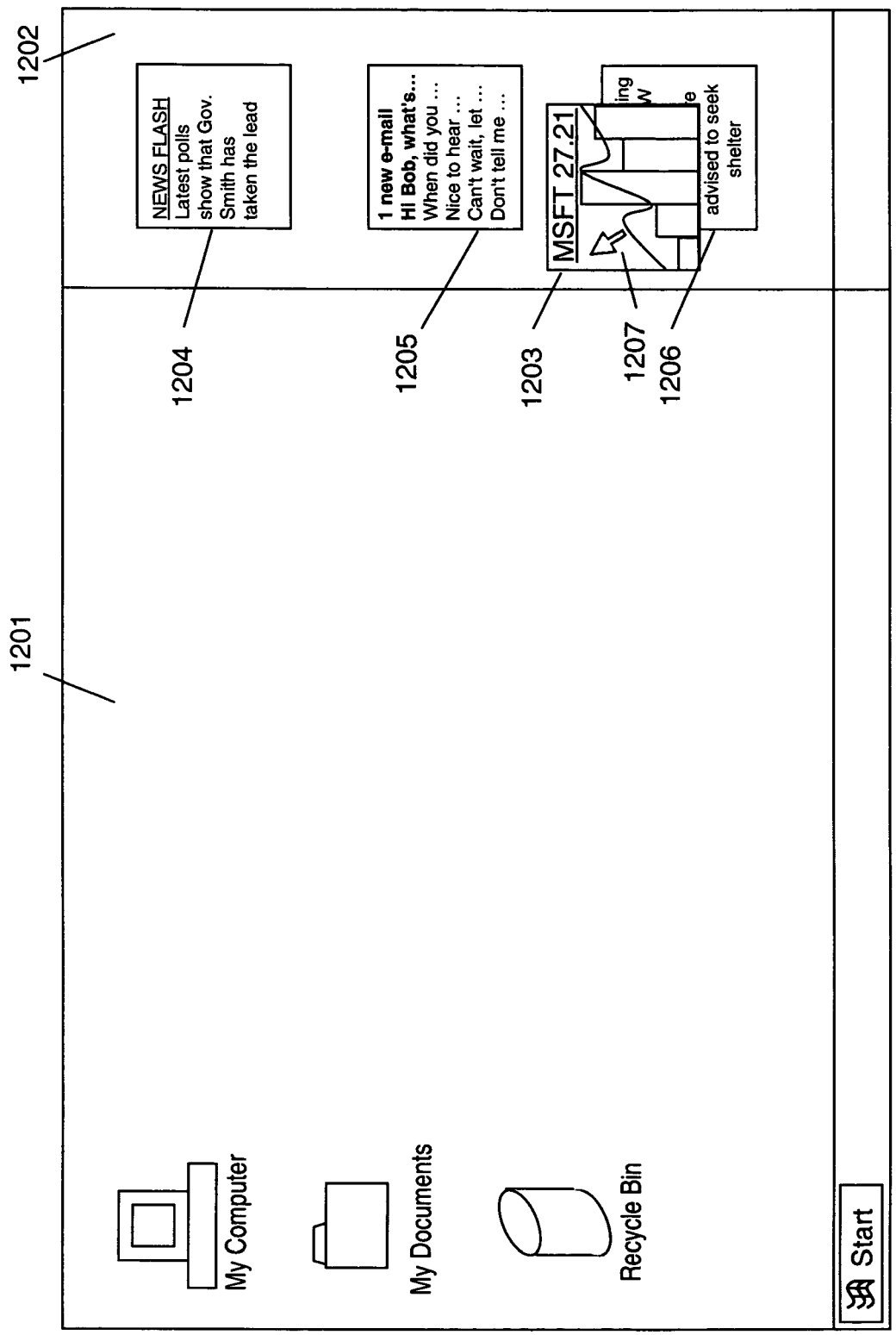
Figure 12D:
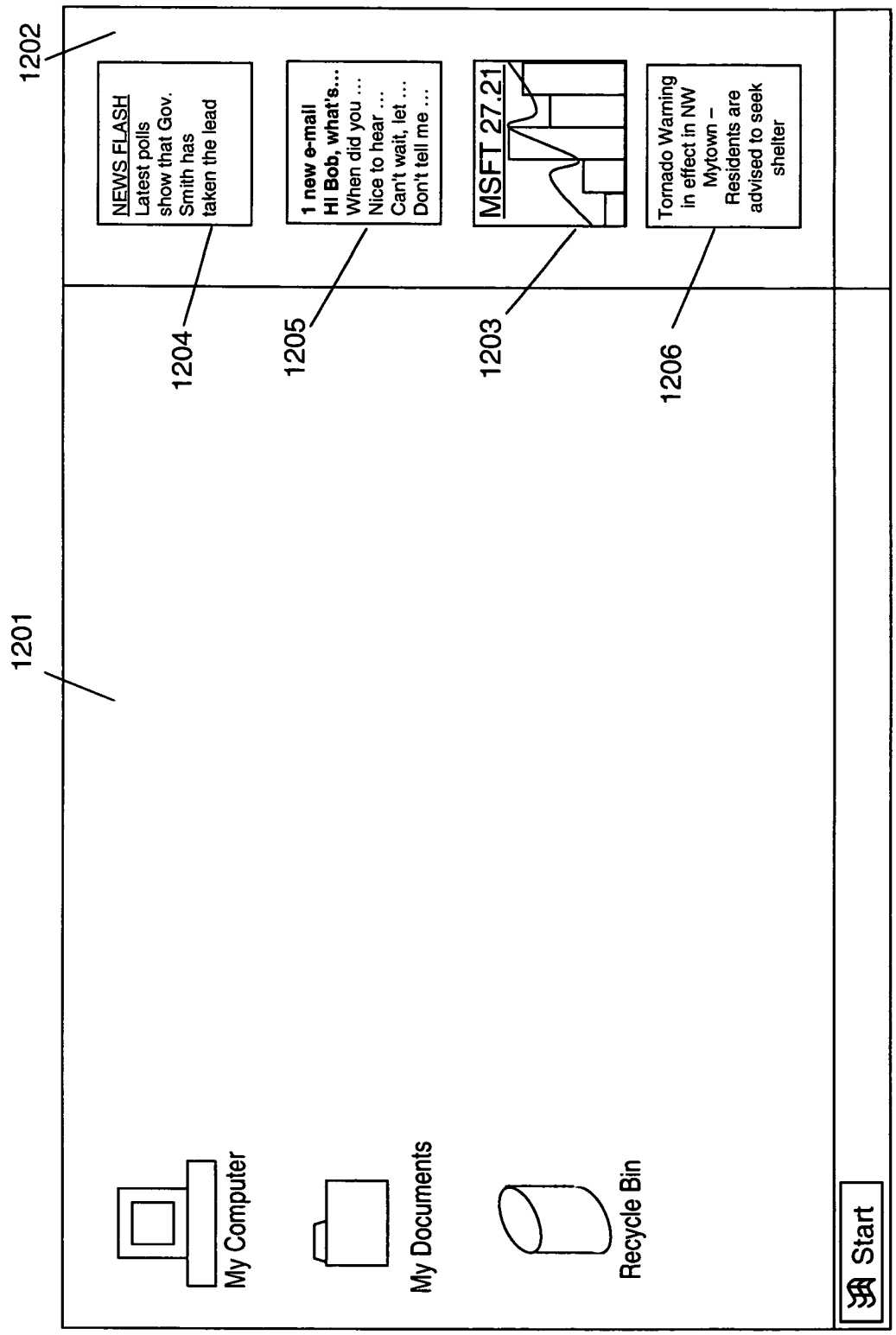

FIG. 12C illustrates the independent user interface prior to positioning of the independent user interface 1203 in the designated area 1202. The independent user interface 1203 being moved into the designated area 1202 overlies other independent user interfaces (e.g., 1206) in the designated area 1202. Thus, if independent user interface 1203 is placed at this location within the designated area 1202, access to independent user interface 1206 would be impeded by independent user interface 1203 overlapping independent user interface 1206. However, as FIG. 12D illustrates, in this example, positioning of the independent user interface 1203 in the designated area 1202 results in automatic rearrangement of the independent user interfaces (e.g., 1204, 1205, and 1206) such that the independent user interfaces (1203, 1204, 1205, and 1206) in the designated area 1202 are substantially evenly spaced. Alternatively, if desired, independent user interfaces may be placed in an overflow area (not shown). This may be desired if the independent user interfaces are too numerous to conveniently place all of them in the designated area.

It is understood that aspects of the present invention can take many forms and embodiments. The embodiments shown herein are intended to illustrate rather than to limit the invention, it being appreciated that variations may be made without departing from the spirit of the scope of the invention. Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

We claim:

1. In a computer system with a display device, a method of displaying information on the display device comprising:
   graphically displaying a plurality of independent user interfaces in a designated area on the display device, said independent user interfaces displaying dynamic information, wherein each independent user interface has a flyout clickable region, wherein the dynamic information is updated periodically and the dynamic information is received over a network;
   moving at least one of said plurality of independent user interfaces from a current location for said at least one of said plurality of independent user interfaces to a destination location;
   when the at least one of said plurality of independent user interfaces is moved to a destination location located inside the designated area, the flyout clickable region extends around at least one edge of the at least one of said plurality of independent user interfaces;
   when the at least one of said plurality of independent user interfaces is moved to a destination location located outside of the designated area, the flyout clickable region surrounds the at least one of said plurality of independent user interfaces; and
   rearranging automatically the plurality of independent user interfaces in the designated area after the moving step so that the plurality of user interfaces in the designated area are substantially evenly spaced.

2. The method of claim 1 wherein the designated area is located on an edge of the display.

3. The method of claim 1 wherein said destination location is outside of said designated area.

4. The method of claim 3 further comprising moving said at least one of said plurality of independent user interfaces from a location outside of said designated area to a location within said designated area.

5. The method of claim 4 further comprising rearranging the plurality of independent user interfaces in the designated area after said at least one of said plurality of independent user interfaces is moved into the designated area so that the plurality of independent user interfaces and the at least one of said plurality of independent user interfaces are substantially evenly spaced in the designated area.

6. The method of claim 1 wherein said destination location is outside of said designated area and at a location occupied by a display element.

7. The method of claim 6 further comprising setting a display priority for the at least one of said plurality of independent user interfaces.

8. The method of claim 7 wherein the step of setting display priority comprises displaying the at least one of said plurality of independent user interfaces in front of the display element.

9. The method of claim 7 wherein the step of setting display priority comprises displaying the at least one of said plurality of independent user interfaces in back of the display element.

10. The method of claim 9 further comprising minimizing the display element on the display when the at least one of said plurality of independent user interfaces is rearranged on the display.

11. The method of claim 10 further comprising restoring the minimized display element after said at least one of said plurality of independent user interfaces is positioned on said display.

12. The method of claim 11 wherein the display element is a window.

13. The method of claim 1 further comprising displaying all independent user interfaces on top of overlapping display elements if a cursor is positioned over a predetermined location on the display.

14. The method of claim 1 wherein said at least one of said plurality of independent user interfaces is associated with a taskbar button.

15. The method of claim 1 further comprising moving an independent user interface out of said designated area; and rearranging automatically display elements on the display so that display elements do not overlap with the independent user interfaces.

16. A system for displaying information on a display device comprising:
   a display device for graphically displaying a plurality of independent user interfaces in a designated area on the display device, said independent user interfaces displaying dynamic information, wherein each independent user interface has a flyout clickable region, wherein the dynamic information consists of stock, weather, sports, sports-related, news, instant messenger, mailbox, or auction information and is updated periodically, and the dynamic information is received over a network; and
   a processor for moving at least one of said plurality of independent user interfaces from a current location for said at least one of said plurality of independent user interfaces to a destination location and for rearranging automatically the plurality of independent user interfaces in the designated area after moving said at least one of said plurality of independent user interfaces so that the plurality of user interfaces in the designated area are substantially evenly spaced, wherein when the at least one of said plurality of independent user interfaces is moved to a destination location located inside the designated area, the flyout clickable region extends around at least one edge of the at least one of said plurality of independent user interfaces and when the at least one of said plurality of independent user interfaces is moved to a destination location located outside of the designated area, the flyout clickable region surrounds the at least one of said plurality of independent user interfaces.

17. The system of claim 16 wherein the designated area is located on an edge of the display.

18. The system of claim 16 wherein said destination location is outside of said designated area.

19. The system of claim 18 wherein said processor further moves said at least one of said plurality of independent user interfaces from a location outside of said designated area to a location within said designated area.

20. The system of claim 18 wherein said processor further rearranges the plurality of independent user interfaces in the designated area after said at least one of said plurality of independent user interfaces is moved into the designated area so that the plurality of independent user interfaces and the at least one of said plurality of independent user interfaces are substantially evenly spaced in the designated area.

21. The system of claim 16 wherein said destination location is outside of said designated area and at a location occupied by a display element.

22. The system of claim 21 further comprising a processor for setting a display priority for the at least one of said plurality of independent user interfaces.

23. The system of claim 22 wherein setting a display priority comprises displaying the at least one of said plurality of independent user interfaces in front of the display element.

24. The system of claim 22 wherein setting a display priority comprises displaying the at least one of said plurality of independent user interfaces in back of the display element.

25. The system of claim 24 wherein said processor further minimizes the display element on the display when the at least one of said plurality of independent user interfaces is rearranged on the display.

26. The system of claim 25 wherein said processor further restores the minimized display element after said at least one of said plurality of independent user interfaces is positioned on said display.

27. The system of claim 26 wherein the display element is a window.

28. The system of claim 16 wherein said processor further displays all independent user interfaces on top of overlapping display elements if a cursor is positioned over a predetermined location on the display.

29. The system of claim 16 wherein said at least one of said plurality of independent user interfaces is associated with a taskbar button.

30. The system of claim 16 wherein said processor further moves at least one of said plurality of independent user interfaces out of said designated area and rearranges automatically display elements on the display so that display elements do not overlap with the at least one independent user interface.

31. A computer-storage medium comprising executable code for performing the steps of:
   graphically displaying a plurality of independent user interfaces in a designated area on the display device, said independent user interfaces displaying stock, weather, sports, sports-related, news, instant messenger, mailbox, or auction information dynamically, wherein dynamically displayed information is updated periodically and received over a network, wherein each independent user interface has a flyout clickable region;
   moving at least one of said plurality of independent user interfaces from a current location for said at least one of said plurality of independent user interfaces to a destination location;
   when the at least one of said plurality of independent user interfaces is moved to a destination location located inside the designated area, the flyout clickable region extends around at least one edge of the at least one of said plurality of independent user interfaces;
   when the at least one of said plurality of independent user interfaces is moved to a destination location located outside of the designated area, the flyout clickable region surrounds the at least one of said plurality of independent user interfaces; and
   rearranging automatically the plurality of independent user interfaces in the designated area after the moving step so that the plurality of user interfaces in the designated area are substantially evenly spaced.

32. The computer-storage medium of claim 31 wherein said destination location is outside of said designated area, the computer-readable medium further comprising computer executable code for moving said at least one of said plurality of independent user interfaces from a location outside of said designated area to a location within said designated area and rearranging the plurality of independent user interfaces in the designated area after said at least one of said plurality of independent user interfaces is moved into the designated area so that the plurality of independent user interfaces and the at least one of said plurality of independent user interfaces are substantially evenly spaced in the designated area.

33. The computer-storage medium of claim 31 wherein said destination location is outside of said designated area and is occupied by a display element, the computer-readable medium further comprising computer executable code for:
   setting a display priority for the at least one of said plurality of independent user interfaces so that the at least one of said plurality of independent user interfaces is displayed in back of the display element; and
   displaying all independent user interfaces on top of the display element if a cursor is positioned over a predetermined location on the display.

34. The computer-storage medium of claim 31 wherein said at least one of said plurality of independent user interfaces is associated with a taskbar button, the computer-readable medium further comprising computer executable code for:
   moving at least one of said plurality of independent user interfaces out of said designated area; and
   rearranging display elements on the display so that display elements do not overlap.

35. In a computer system having a graphical user interface including a display, a method of providing the graphical user interface on the display, comprising the steps of:
   (a) retrieving a set of independent user interfaces for the graphical user interface, said independent user interfaces providing alphanumeric dynamic information, wherein each independent user interface within the set of independent user interfaces has a flyout clickable region and the alphanumeric dynamic information is updated periodically, and the alphanumeric dynamic information is received over a wide area network;
   (b) displaying the graphical user interface comprising the set of independent user interfaces on the display;
   (c) moving at least one of the independent user interfaces from a current location in the graphical user interface to a destination location;
   when the at least one of the independent user interfaces is moved to a destination location located inside the designated area, the flyout clickable region extends around at least one edge of the at least one of the independent user interfaces;
   when the at least one of the independent user interfaces is moved to a destination location located outside of the designated area, the flyout clickable region surrounds the at least one of the independent user interfaces; and
   (d) rearranging automatically the set of independent user interfaces in the graphical user interface after the moving step so that the set of independent user interfaces in the graphical user interface are substantially evenly spaced.

* * * * *

UNITED STATES PATENT AND TRADEMARK OFFICE
CERTIFICATE OF CORRECTION

PATENT NO.       : 7,657,842 B2                                    Page 1 of 1
APPLICATION NO.  : 10/985919
DATED            : February 2, 2010
INVENTOR(S)      : Matthews et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 922 days.

Signed and Sealed this

Thirtieth Day of November, 2010

David J. Kappos
*Director of the United States Patent and Trademark Office*